US012063617B2

(12) United States Patent
Cheng

(10) Patent No.: US 12,063,617 B2
(45) Date of Patent: Aug. 13, 2024

(54) METHOD AND USER EQUIPMENT FOR IMPLEMENTING NTN MOBILITY

(71) Applicant: Acer Incorporated, New Taipei (TW)

(72) Inventor: Ching-Wen Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 400 days.

(21) Appl. No.: 17/412,203

(22) Filed: Aug. 25, 2021

(65) Prior Publication Data
US 2022/0070812 A1 Mar. 3, 2022

Related U.S. Application Data

(60) Provisional application No. 63/071,371, filed on Aug. 28, 2020.

(51) Int. Cl.
*H04W 60/04* (2009.01)
*H04W 24/10* (2009.01)
(Continued)

(52) U.S. Cl.
CPC .......... *H04W 60/04* (2013.01); *H04W 24/10* (2013.01); *H04W 84/042* (2013.01); *H04W 84/06* (2013.01)

(58) Field of Classification Search
CPC ... H04W 60/04; H04W 24/10; H04W 84/042; H04W 84/06; H04W 36/0094;
(Continued)

(56) References Cited

U.S. PATENT DOCUMENTS

2008/0108353 A1 5/2008 Lee et al.
2010/0120426 A1 5/2010 Singh et al.
(Continued)

FOREIGN PATENT DOCUMENTS

AU 2020223645 3/2021
CN 110100492 8/2019
(Continued)

OTHER PUBLICATIONS

Technical Specification Group Radio Access Network, "Solutions for NR to support non-terrestrial networks", 3GPP TR 38.821 V1.0.0, Dec. 2019, pp. 1-143.
(Continued)

*Primary Examiner* — Chi H Pham
*Assistant Examiner* — Oladiran Gideon Olaleye
(74) *Attorney, Agent, or Firm* — JCIPRNET

(57) ABSTRACT

The disclosure is directed to a method used by a user equipment for implementing non-terrestrial network (NTN) to terrestrial network (TN) communication and a user equipment using the same method. In one of the exemplary embodiments, the disclosure is directed to a method used by a user equipment for implementing NTN to TN communication. The method would include not limited to: receiving a cell search and measurement configuration from a non-terrestrial network (NTN), the cell search and measurement configuration comprises information of at least one carrier frequency and at least one NTN tracking area (TA) associated with the carrier frequency; initiating a cell search and measurement procedure; and performing the cell search and measurement procedure by applying the cell search and measurement configuration.

29 Claims, 25 Drawing Sheets

(51) Int. Cl.
*H04W 84/04* (2009.01)
*H04W 84/06* (2009.01)

(58) Field of Classification Search
CPC . H04W 48/12; H04W 36/0066; H04W 48/08; H04W 24/08; H04W 48/16; H04B 7/18545
USPC .......................................................... 370/329
See application file for complete search history.

(56) References Cited

U.S. PATENT DOCUMENTS

| | | | |
|---|---|---|---|
| 2017/0280374 A1 | 9/2017 | Hayes et al. | |
| 2017/0331577 A1* | 11/2017 | Parkvall | H04W 8/18 |
| 2017/0331670 A1* | 11/2017 | Parkvall | H04L 41/0816 |
| 2019/0166513 A1* | 5/2019 | Lin | H04W 24/10 |
| 2019/0364492 A1* | 11/2019 | Azizi | H04W 76/14 |
| 2019/0380128 A1* | 12/2019 | Park | H04W 48/20 |

FOREIGN PATENT DOCUMENTS

| | | | |
|---|---|---|---|
| CN | 111294801 | 6/2020 | |
| EP | 3787348 | 3/2021 | |
| GB | 201812978 | 9/2018 | |
| JP | 2012508524 | 4/2012 | |
| KR | 20200086623 | 7/2020 | |
| WO | 2020038824 | 2/2020 | |
| WO | WO-2020067826 A1 * | 4/2020 | ........ H04W 36/0058 |
| WO | 2020114276 | 6/2020 | |
| WO | 2020165675 | 8/2020 | |
| WO | WO-2020165675 A1 * | 8/2020 | ........ G01S 19/254 |

OTHER PUBLICATIONS

Technical Specification Group Radio Access Network, "Study on New Radio (NR) to support non-terrestrial networks", 3GPP TR 38.811 V15.3.0, Jul. 2020, pp. 1-126.
Nokia, "Report of Email Discussion [106#72] [NR/NTN] TP on NTN-TN Service continuity", 3GPP TSG-RAN WG2 Meeting #107, Aug. 2019, pp. 1-16.
CATT, "Cell Selection and Reselection Issue between NTN and TN System", 3GPP TSG-RAN WG2 Meeting #107bis, Oct. 2019, pp. 1-2.
Nokia, "Analysis on Tracking Area design", 3GPP TSG-WG3 Meeting #104, May 2019, pp. 1-5.
"Search Report of Europe Counterpart Application", issued on Jan. 27, 2022, pp. 1-15.
3GPP, "3rd Generation Partnership Project; Technical Specification Group Radio Access Network;Solutions for NR to support non-terrestrial networks (NTN)(Release 16)", 3GPP TR 38.821 V16.0.0, Dec. 2019, pp. 1-19.
Technical Specification Group Radio Access Network, "Solutions for NR to support non-terrestrial networks (NTN)", 3GPP TR 38.821, V16.0.0, Dec. 2019, pp. 1-9.
Fraunhofer IIS et al., "NR-NTN: Tracking Areas Management", 3GPP TSG-RAN WG3 Meeting #102, Nov. 12-16, 2018, pp. 1-11.
Huawei et al., "Discussion on SMTC configuration for early measurement", 3GPP TSG-RAN WG2 Meeting #105bis, Xian, China, Apr. 8-12, 2019, pp. 1-5.

* cited by examiner

METHOD AND USER EQUIPMENT FOR IMPLEMENTING NTN MOBILITY

This application claims the priority benefit of U.S.A. provisional application Ser. No. 63/071,371, filed on Aug. 28, 2020. The entirety of the above-mentioned patent application is hereby incorporated by reference herein and made a part of specification.

TECHNICAL FIELD

The disclosure is directed to a method used by a user equipment for implementing NTN to NT non-terrestrial network (NTN) to terrestrial network (TN) communication and a user equipment using the same method.

BACKGROUND

Currently, the fifth-generation (5G) communication system and beyond has attempted to integrate communications involving a non-terrestrial network (NTN) and terrestrial network (TN). The NTN currently exists in the form of communications involving non-terrestrial NR access to UEs by means of transmissions via a transmission or reception function (device) embarked on an airborne or space-borne vehicle. The NTN includes an NG-RAN including gNBs, which provide non-terrestrial NR access to UEs by means of an NTN payload embarked on an airborne or space-borne NTN vehicle and an NTN Gateway. A NTN payload is a network node, embarked on board a satellite or high altitude platform station, providing connectivity functions, between the service link and the feeder link. In the current version of this specification, the NTN payload is a transport network layer (TNL) node. By routing messages through NTN, the network may offer wireless coverages to a person anywhere at any time. The TN currently exists in the form of earth based regional networks. For NTN, a NTN tracking area (TA) corresponds to a fixed geographical area. The surface of the earth is divided into NTN tracking areas to account for user equipment (UE) mobility as the UE may migrate from one NTN TA into another. When the UE connects to a TN, the UE may perform a cell search and measurement based on the information from a previously configured synchronization signal block (SSB)-based radio resource management (RRM) measurement timing configuration (SMTC) in order to efficiently perform intra-frequency, inter-frequency, or inter-RA∘T (inter radio access technology) measurements. The configuration of the SMTC is per carrier frequency. Also, the configuration of the SMTC is based on a timing of a New Radio (NR) primary cell (PCell) or a primary secondary cell (PsCell) such that the SFN (System Frame Number), the subframe number, and the starting time of the subframe boundary are taking to evaluate the condition of the SMTC configuration. Therefore, the timing of a NR PCell or a PsCell of a UE is the reference timing of the configuration of the SMTC. The SMTC includes a periodicity parameter, an offset parameter, and a duration parameter.

FIG. 1 shows an example of configuring a timing configuration for cell search by using SMTC. The reference signal of a cell in this example is a SSB. As shown in FIG. 1, the fields of SMTC contains parameters that define the periodicity, the offset, and the duration of a reference signal. The duration parameter indicates the duration of a measurement window in which to receive the reference signal. The periodicity parameter indicates the periodicity for a UE to receive the reference signal. The offset parameter indicates the offset subframe numbers for a UE to receive the reference signal. UE take the subframe boundary of the special primary cell (SpCell) of the UE (i.e., the primary cell (PCell) of the UE when a master cell group is configured for the UE or the primary secondary cell (PsCell) of the UE when a secondary cell group is configured for the UE) as the timing for cell search to acquire time and frequency synchronization with a cell and to detect the physical layer Cell ID of the cell. With the timing configuration of SMTC for measurement gap configuration, UE can perform cell search and measure the signal strength and/or signal quality of the reference signals accordingly without searching reference signals blindly on a carrier frequency. In the example of the parameters that are selected in the example of FIG. 2, the periodicity is sf10 which is 10 subframes or 10 milliseconds (ms), the offset is 2 which is 2 ms, and the duration is sf5 which is 5 subframes. The meaning of each field of the SMTC is currently known and is consistent with the current 5G standard.

However, it is worth noting that even though using SMTC could be optional, not using SMTC may result in a terminal device consuming more power in performing cell search and measurements especially when connecting to a NTN. Currently, the NTN may support the SSB periods as previously defined in a TN as the NR SSB periodicity could be selected from one of 5, 10, 20, 40, 80, and 160 ms. If a SMTC is not provided by a serving cell, then the UE would assume a 5 ms SSB periodicity per carrier frequency and may perform a period (e.g., 20 ms) of blind detection on a carrier frequency in order to determine whether or not a cell has been deployed on that particular carrier frequency (i.e., to perform cell search on a carrier frequency). Therefore, when the network configured the UE to perform cell search on a carrier frequency without SMTC, the UE has to consume power to perform cell search on the carrier frequency during a time window where no cell is deployed.

Perform cell searches and measurements could be challenging in the NTN and TN co-existing environment when a UE is capable of both NTN and TN communications. FIG. 3 shows the coverage of a NTN cell is relatively larger than the coverage of a TN cell. A NTN cell may overlap with multiple TN cells. The TN cells may be operated by multiple public land mobile network (PLMN) on various carrier frequencies. Thus, the neighboring cells of a NTN cell could be operated by different operators and may span multiple countries or a very large territory. As shown in FIG. 3a, the NTN cell has a coverage area that overlaps with the coverage area of many TN cells including TN cells that operate with the carrier frequency f1 and the TN cells that operate with the carrier frequency f2. The number of neighboring cells and neighboring frequencies of a NTN cell could be considered to be significantly more than the neighboring cells and neighboring frequencies of a TN cell. There could be the case that a TN cell which is considered as a neighboring cell of a NTN cell when the coverage of the TN cell partially or totally overlapped with the coverage of the NTN cell but is far from where the UE located (e.g., the TN cell and the UE are located on different islands or lands).

In the deployment that NTN and TN co-exist, two issues may arise. The first is related to how the serving cell would assist a UE to initiate the cell search and measurement of a neighboring TN cell with considering reducing UE power consumption in searching the frequencies or cells that could be far from where the UE locates. The second issue is related to the handling of reference timing between NTN and TN.

In TN the timing of the SpCell (special cell) of a UE is utilized as the reference timing for measurement gap configuration and for reference signal detection of neighboring cells. However, in NTN the propagation delay between a UE and the serving gNB changes over time when the airborne or space-borne vehicle that the NTN payload embarked on moves over time. The timing of the SpCell of the UE (i.e., a NTN cell) changes overtime for the propagation delay between the gNB and the NTN payload as well as the propagation delay between the NTN payload and the UE changes over time, it is not feasible to take the timing of a NTN cell as reference timing for measurement gap configuration or for cell search/reference signal detection of neighbor cells. Thus, the second issue comes about. As shown in FIG. 4, assuming the UE is a stationary UE and the first signaling path 401 has a signal that originates from gNB1 at time t1 and is transmitted to the UE via the satellite Sat1, and such signal is received by the UE at time (t1+Δt), wherein Δt is the propagation delay between gNB1 and the UE. However, after time tx elapsed, the satellite Sat1 is assumed to have moved distance dx, and thus the second signaling path 402 has a signal that originates from gNB1 at time (t1+tx) and is transmitted to the UE via the satellite Sat1, and such signal is received by the UE at time (t1+tx+Δt+Δt'), wherein Δt' is the timing drift of the propagation delay between UE and gNB1 according to the distance dx that the satellite Sat1 moved from time t1 to time (t1+tx). Thus, as shown in the example of FIG. 4, it is not feasible to apply the timing of the NTN serving cell of the UE when performing cell searches and measurements of TN reference signals. Further, the TN cells across different regions may not even be timing aligned.

Each NTN tracking area (TA) is configured to be corresponded to a fixed geographic area. As shown in FIG. 5, this implies that NTN tracking area (TA) is associated with fixed geographic area. There could be multiple NTN TAs (e.g. NTN TA1, NTN TA2, etc) covered by the coverage of a NTN cell, and each NTN TA could be associated with a group of TN cells that are also fixed on the ground and associated with fixed geographic location/area. In the example of FIG. 5, NTN TA1 is associated with a group of TN cells operating in the first carrier frequency f1 and NTN TA2 is associated with a group of TN cells operating in the second carrier frequency f2. A UE determines the NTN TA associated with the location of the UE e.g., according to pre-configuration of the mapping of geographic area and NTN TA, or according to the system information broadcast by the NTN serving cell. When UE locates in NTN TA1, there is only neighboring cells operated on carrier frequency f1 could be detected by the UE. However, according to legacy (TN) cell search and measurement configuration, including cell reselection information configured by dedicated RRC signaling or by broadcast system information, both carrier frequencies f1 and f2 are considered as frequencies of neighboring cells that the UE needs to perform cell searches and measurements on when cell search and measurement procedure is initiated (e.g., for cell reselection or cell selection). A mechanism to allow a NTN and TN capable UE served by a NTN cell to determine frequencies of neighboring TN cells when operating in NTN and TN co-exist environment and a mechanism to allow a UE to handle timing for measurement gaps and cell search in order to perform cell search and measurement of neighboring cells are necessary.

SUMMARY OF THE DISCLOSURE

Accordingly, the disclosure is directed to a method used by a user equipment for implementing NTN mobility and a user equipment using the same method.

In one of the exemplary embodiments, the disclosure is directed to a method used by a user equipment for implementing NTN mobility. The method would include not limited to: receiving a cell search and measurement configuration from a non-terrestrial network (NTN) comprises information of at least one carrier frequency and at least one NTN tracking area (TA) associated with the carrier frequency; initiating a cell search and measurement procedure; and performing the cell search and measurement procedure by applying the cell search and measurement configuration.

In one of the exemplary embodiments, the disclosure is directed to a user equipment which includes not limited to: a receiver, and a processor coupled to the receiver. The processor is configured at least to: receive a cell search and measurement configuration from a non-terrestrial network (NTN) for performing the cell search and measurement procedure, initiate a cell search and measurement procedure for a cell of belonging to a terrestrial network (TN), and perform the cell search and measurement procedure by applying the cell search and measurement configuration.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
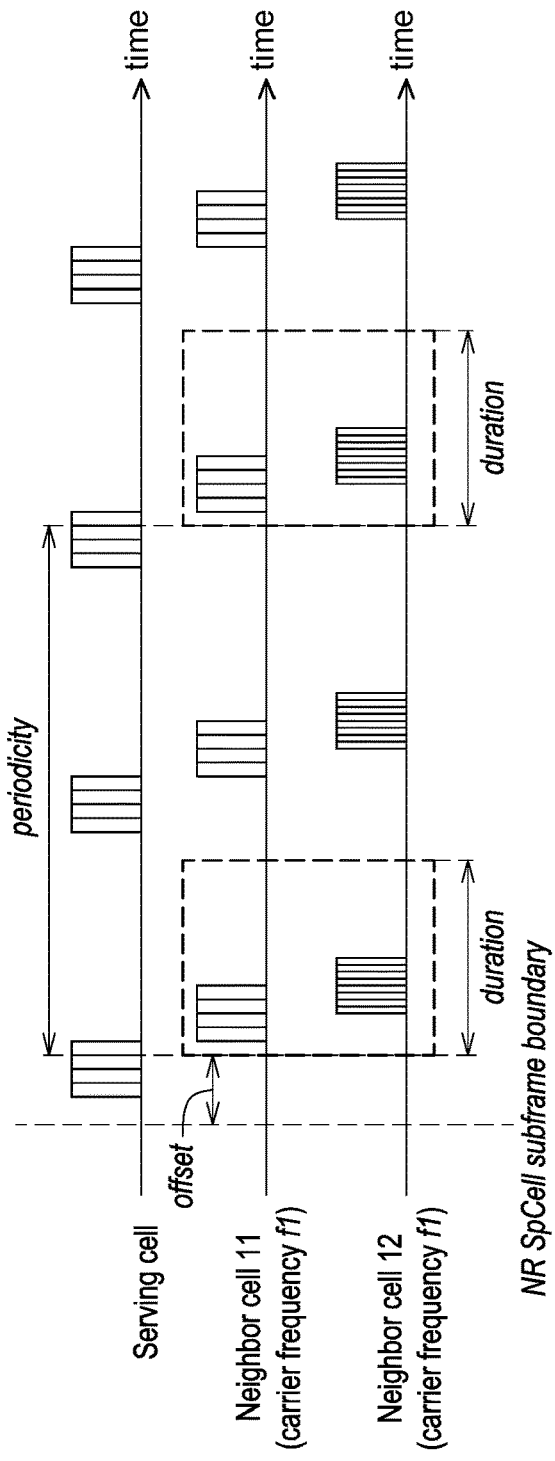
FIG. 1 illustrates an example of configuring a timing configuration by using SMTC.
Figure 2:
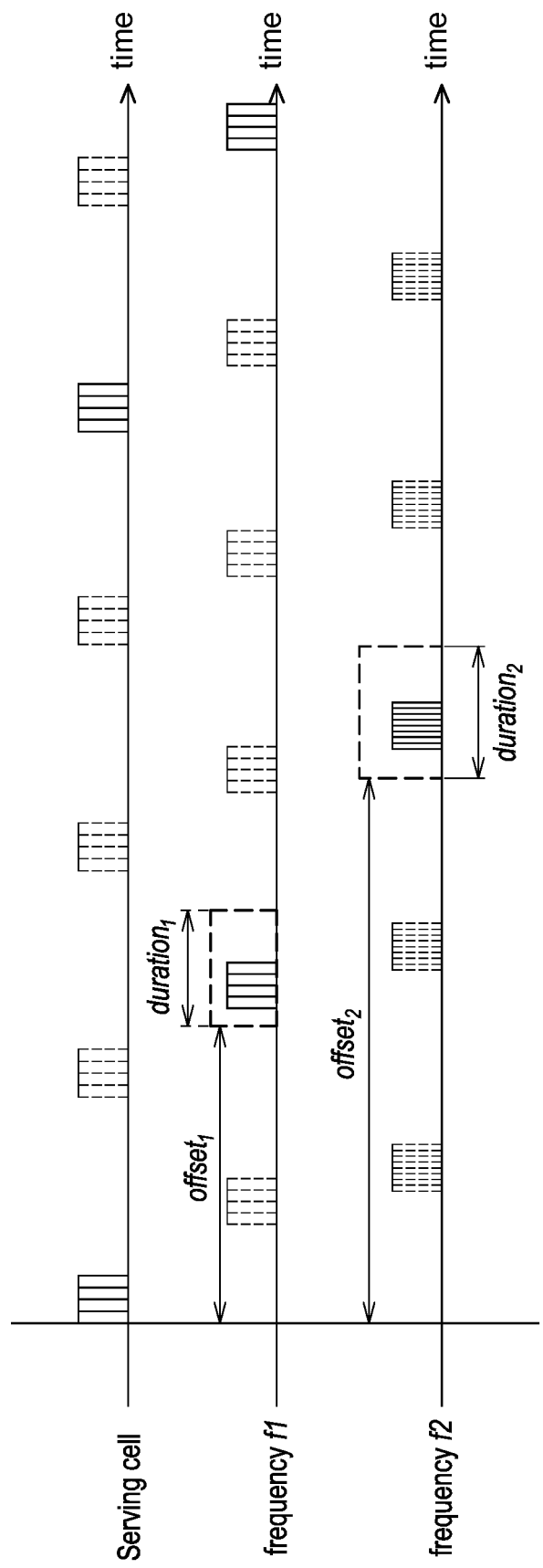
FIG. 2 illustrates a comparison between configuring a timing configuration by using SMTC.
Figure 3:
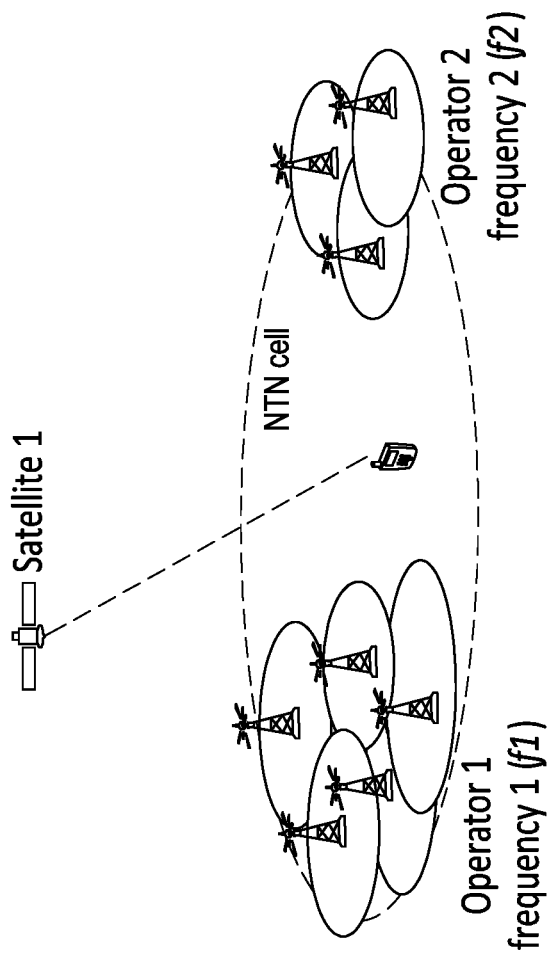
FIG. 3 illustrates a first issue related to the co-existence of NTN and TN.
Figure 4:
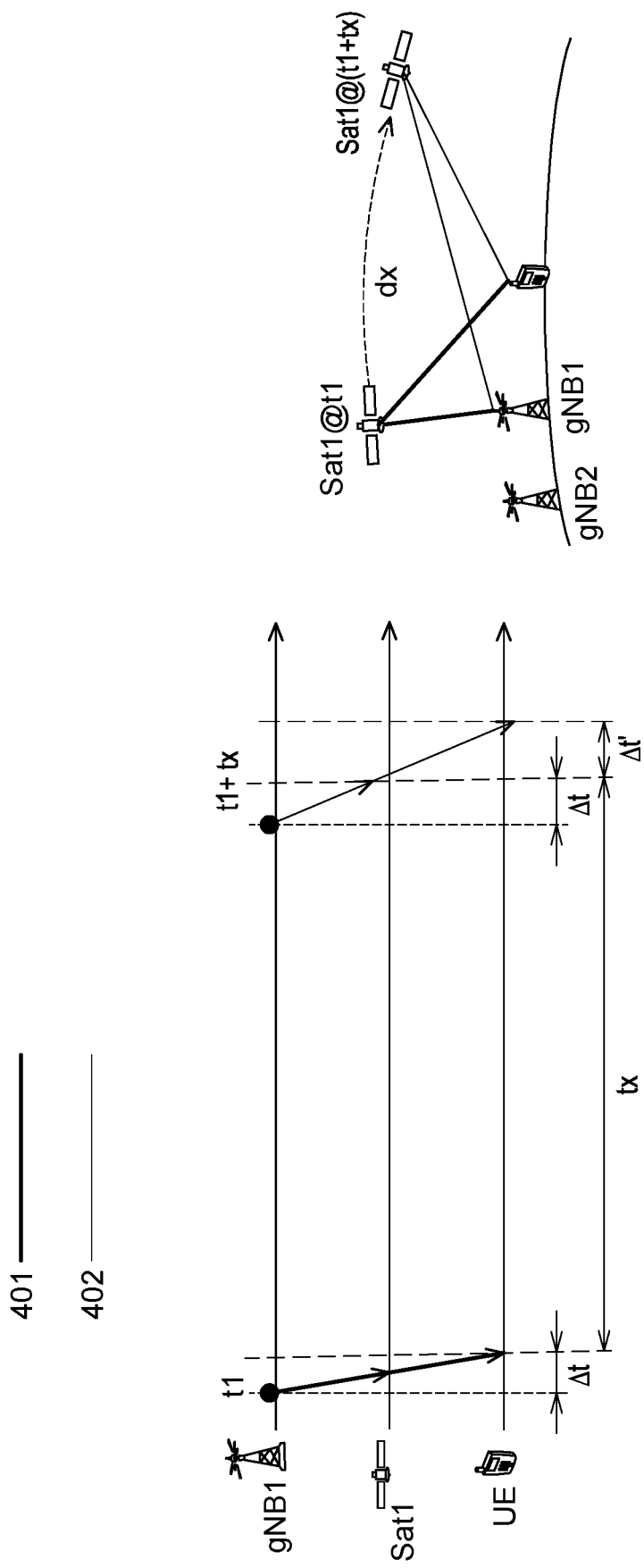
FIG. 4 illustrates a second issue related to the co-existence of NTN and TN.
Figure 5:
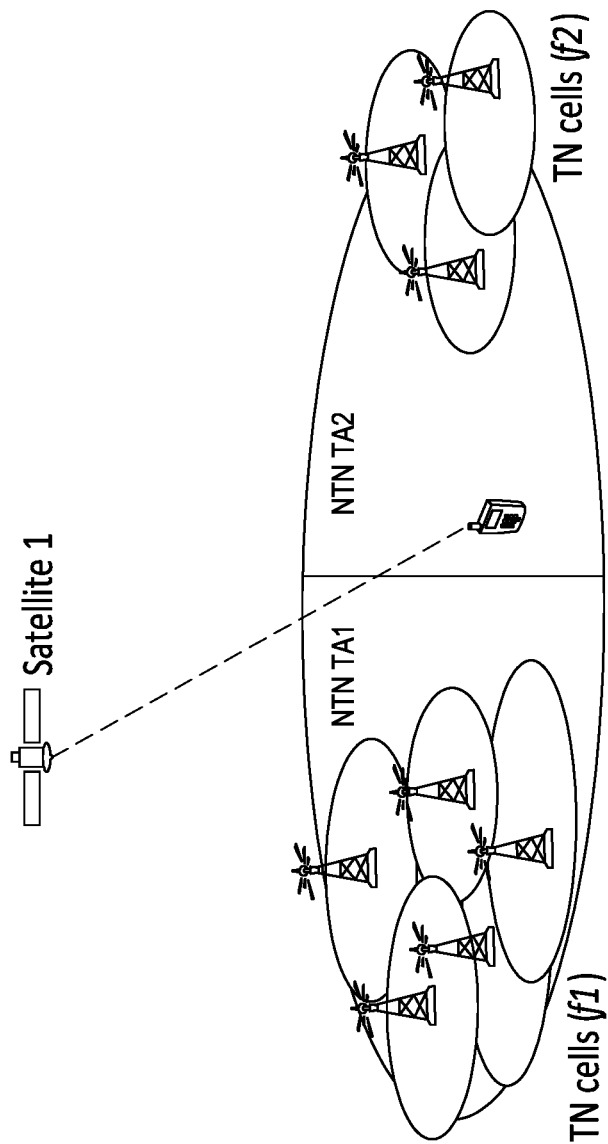
FIG. 5 illustrates a recent feature of the NTN.

Reference will now be made in detail to the present exemplary embodiments of the disclosure, examples of which are illustrated in the accompanying drawings. Wherever possible, the same reference numbers are used in the drawings and the description to refer to the same or like parts.

In order to resolve the above described difficulties, the disclosure provides a method used by a user equipment for implementing NTN mobility and a user equipment using the same method. The disclosure is aimed to provide a mechanism to organized carrier frequencies of neighboring NTN cells and TN cells and for the UE to handle reference timing for the cell search and measurements of carrier frequencies of neighboring cells. The organization of neighboring TN carrier frequencies or cells could be based on their association with NTN TAs. The NTN cell that is serving a UE may provide to the UE a configuration including information of timing configuration for the UE to perform cell search and measurement. A UE may handle the timing configuration by utilizing the timing of a first detected TN cell (i.e., the first TN cell which have been searched/detected by a cell search procedure) to adjust the offset value of the timing configuration (e.g., SMTC) for TN carrier frequencies or cells. The UE may need to perform cell search blindly without assistance of reference timing for a TN cell first. After successfully searched a first TN cell, the UE may apply the TN cell timing for performing cell searches and measurements of other neighboring TN cells.

Figure 6:
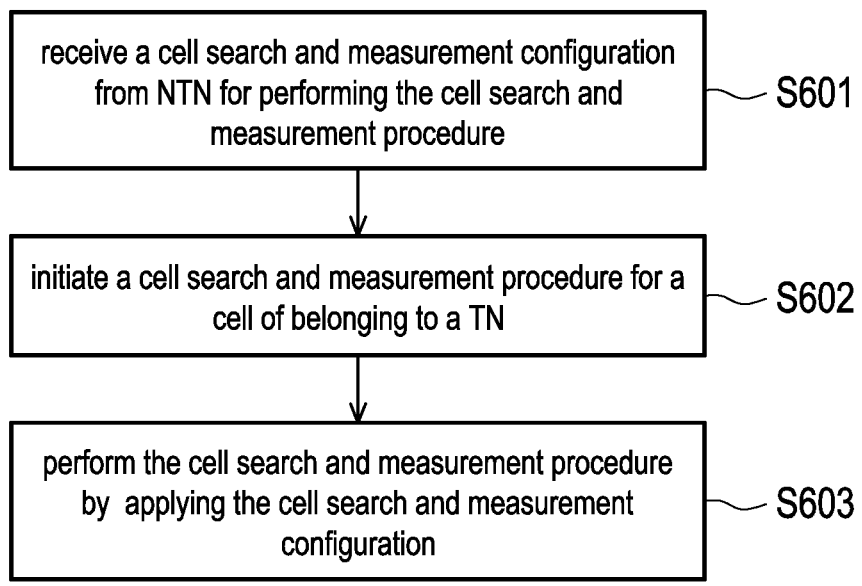
FIG. 6 illustrates a method used by a user equipment for implementing NTN mobility according to an exemplary embodiment of the disclosure.

FIG. 6 is a flow chart which shows the method used by a user equipment for implementing NTN mobility. Referring to FIG. 6, in step S601, the UE would receive a cell search and measurement configuration from a NTN which includes information of at least one carrier frequency and at least one NTN TA associated with the carrier frequency. In step S602, the UE would initiate a cell search and measurement procedure. In step S603, the UE would perform the cell search and measurement procedure by applying the cell search and measurement configuration. The cell search and measurement procedure may occur under circumstances, for example, when a UE migrates from one area to another area or when a UE just powers on or according to the configuration of cell reselection priority. Essentially, the UE may perform a cell search for a cell of a TN by adhering to information from the NTN assuming that the UE is able to identity its current NTN TA and is able to receive information from its serving NTN cell, and such information could be organized with associating cell search and measurement configuration with NTN TAs that the cell search and measurement configuration are applicable.

According to an exemplary embodiment, receiving the cell search and measurement configuration may include receiving the cell search and measurement configuration from a dedicated signaling which is transmitted via a downlink shared channel and is dedicated to be transmitted to the UE. Similarly, receiving the cell search and measurement configuration may include receiving the cell search and measurement configuration from a broadcasted signaling which is transmitted via a broadcast channel.

According to an exemplary embodiment, the at least one carrier frequency of the cell search and measurement configuration associated with an allowed cell list may include at least one identity of a cell, and performing the cell search and measurement procedure further include performing the cell search and measurement procedure only among the cells that appear on the allowed cell list associated with the carrier frequency. Similarly, the at least one carrier frequency of the cell search and measurement configuration could be associated with a forbidden cell list including at least one identity of a cell, and performing the cell search and measurement procedure may further include not performing the cell search and measurement procedure among the cells that appear on the forbidden cell list associated with the carrier frequency.

According to an exemplary embodiment, the method may further include only performing the cell search and measurement procedure on the at least one carrier frequency associated with the UE determined NTN TA when at least one carrier frequency is associated with the UE determined NTN TA. The method may also further include not performing the cell search and measurement procedure when there is no any carrier frequency or cell in the cell search and measurement configuration associated with the UE determined NTN TA. The method may also further include stop performing the cell search and measurement procedure by applying the cell search and measurement configuration when the cell search and measurement configuration is outdated or invalid. The method may also further include determining the outdated or invalid of the cell search and measurement configuration according to a validity time. The validity time could be configured by a value of a timer that the cell search and measurement configuration is valid before the expiry of the timer. The validity time may also be configured by a starting time and a stopping time of an applicable period of the cell search and measurement configuration.

According to an exemplary embodiment, the method may further include determining the outdated or invalid of the cell search and measurement configuration according to a validity area. The validity area may be associated with one or more NTN Tracking Area Code (TAC)/Tracking Area Identifier (TAI), or be associated with a geographic area represented in a form of latitude and longitude coordination, or be associated with one or more NTN cell identities. The method may also further include stop performing the cell search and measurement procedure when the UE cannot determine the NTN TA which the UE located in. The at least one carrier frequency could be further associated with a timing configuration which is a time domain reference information for performing the cell search and measurement procedure on the carrier frequency. Similarly, the timing configuration could be associated with a validity period and the validity period is represented by the starting time and stopping time of the validity period. Similarly, the timing configuration is associated with a validity area.

According to an exemplary embodiment, performing the cell search and measurement procedure may include determining, from the cell search and measurement configuration, a timing configuration and performing the cell search and measurement procedure by using the timing configuration for searching cells. Similarly, performing the cell search and measurement procedure may include performing the cell search and measurement procedure for a first carrier frequency of a first cell of the cells without applying the timing configuration associated with the first carrier frequency of the cell search and measurement configuration when there is no first reference timing has been determined as available for the cell search and measurement procedure and using the timing of the subframe boundary of the first cell as a first reference timing determined for the cell search and measurement procedure in response to the first reference timing being unavailable from the cell search and measurement configuration.

Similarly, performing the cell search and measurement procedure may include determining an applicable offset value for a second carrier frequency in response to the first timing configuration being available from the cell search and measurement configuration, by calculating the difference value between the offset value of the timing configuration associated with the first carrier frequency and the offset value associated with the timing configuration associated with the second carrier frequency and generating an executive timing configuration associated with the second carrier frequency for performing the cell search and measurement procedure on the second carrier frequency by using the applicable offset value to substitute the offset value of the timing configuration associated with the second carrier frequency. Performing the cell search and measurement procedure may further include performing cell search and measurement procedure for the second carrier frequency of a second cell of the cells by using the executive timing configuration associated with the second carrier frequency.

According to an exemplary embodiment, the cell search and measurement configuration may include an allowed cell list, and performing the cell search and measurement procedure among the neighboring cells may further include performing the cell search and measurement procedure only among the neighboring cells that appear on the allowed cell list. Similarly, the NTN TA based cell search and measurement configuration may further include a forbidden cell list, and performing the cell search and measurement procedure among the neighboring cells may further include not performing the cell search and measurement procedure among the neighboring cells that appear on the forbidden cell list. Similarly, the cell search and measurement configuration may further include a PLMN list, and performing the cell search and measurement procedure may further include not performing the cell search and measurement procedure if none of home PLMN of the UE, registered PLMN of the UE, equivalent home PLMN (EHPLMN) of the UE or equivalent registered PLMN (ERPLMN) of the UE appear on the PLMN list.

According to an exemplary embodiment, the cell search and measurement configuration may include a SMTC associated with a carrier frequency of the cell search and measurement configuration. An entry of the allowed cell list, forbidden cell list, and the PLMN list could be associated with a SMTC as indicated by the cell search and measurement configuration. The SMTC may include an offset value for calculating the timing, a duration window for receiving a SSB, and a periodicity of the measurement window.

Figure 7:
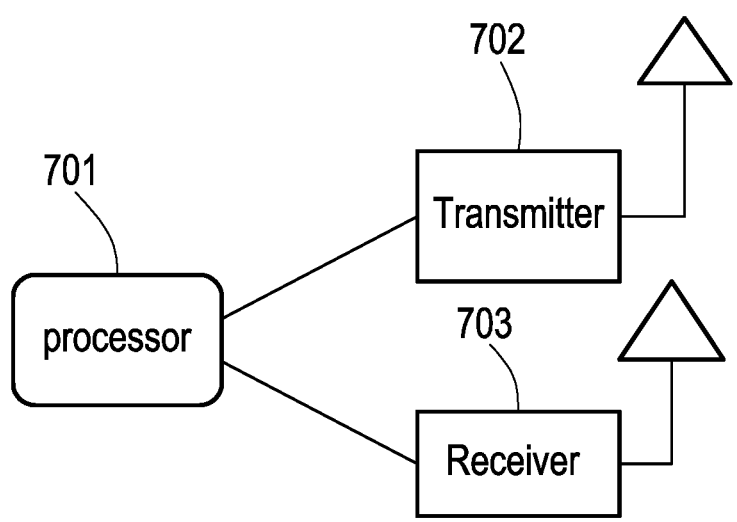
FIG. 7 illustrates a hardware diagram of the user equipment that uses the method of FIG. 6 according to an exemplary embodiment of the disclosure.

FIG. 7 is a hardware block diagram of an exemplary UE that uses the method described in FIG. 6. The UE may include not limited to a hardware processor 701, a transmitter 702, a receiver 703, and a non-transitory storage medium. The hardware processor 701 are electrically connected to the transmitter 702 and the receiver 703 and the non-transitory storage medium and configured at least for implementing the method as described in FIG. 6 and subsequent exemplary embodiments.

The transmitter 702 and the receiver 703 could be integrated as one or more integrated or separate transceiver module, and each of the transceiver modules may include one or more transceivers which could be integrated or separate transmitters and receivers configured to transmit and receive signals respectively in the radio frequency or in the mmWave frequency. The hardware transceivers (e.g. 702 703) may also perform operations such as low noise amplifying, impedance matching, frequency mixing, up or down frequency conversion, filtering, amplifying, and so forth. The hardware transceivers may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceivers may each further include an antenna array which may include one or multiple antennas to transmit and receive omni-directional antenna beams or directional antenna beams.

The hardware processor 701 is configured to process digital signals and to perform procedures of the proposed method in accordance with the proposed exemplary embodiments of the disclosure. Also, the hardware processor 701 may access to a non-transitory storage medium which stores programming codes, codebook configurations, buffered data, and record configurations assigned by the hardware processor 701. The hardware processor 801 could be implemented by using programmable units such as a microprocessor, a micro-controller, a DSP chips, FPGA, etc. The functions of the hardware processor 1001 may also be implemented with separate electronic devices or ICs. It should be noted that the functions of hardware processor 701 may be implemented with either hardware or software.

In order to further elucidate the concepts as described in FIG. 6 and FIG. 7, the disclosure provides several exemplary embodiments as shown in FIG. 8~25 and as explained by their corresponding written descriptions. The overall mechanism provided in this disclosure may have two phases, a configuration phase and an execute phase. During the configuration phase, the UE may receive a cell search and measurement configuration from a NTN cell that is currently serving the UE. During the execution phase, the UE may perform a cell search and measurement procedure for a TN cell by using the cell search and measurement configuration that was received from the NTN cell.

During the configuration phase, the neighboring TN frequencies or cells have been associated with their associated NTN TAs. The TN frequencies or cells may further be grouped based on the associated NTN TAs. When the cell coverage of a TN cell overlaps with the cell coverage of a NTN cell, the TN cell is considered as a neighboring TN cell of the NTN cell. Thus, the carrier frequency of a neighboring cell could be considered as a neighboring frequency of a NTN cell.

In order for the NTN cell to provide the search and measurement configuration to the UE, the UE would receive information from its NTN serving cell. A UE may receive such information from its NTN serving cells in two ways. A UE may receive the search and measurement configuration from its NTN serving cell via a dedicated signaling when the UE is in a RRC_CONNECTED state to the NTN serving cell or the UE may receive the search and measurement configuration via a system information (SI) broadcast when the UE is in a RRC_CONNECTED, RRC_IDLE or RRC_INACTIVE state to the NTN serving cell.

After the configuration phase, a UE may enter an execution phase. During an execution phase, the UE may only need to perform a cell search and measurement procedure on the TN frequencies associated with the NTN TA which covers the UE location. In other words, the UE may perform a TN cell search and measurements according to the cell search and measurement configuration provided from the serving NTN cell. FIG. 8~15 describes a first set of exemplary embodiments in which a UE performs cells search and measurements, and FIG. 16~25 describes a second set of exemplary embodiments in which a UE performs cell search and measurements by using timing configuration information (e.g., SMTC). The disclosure will proceed to describe the first set of exemplary embodiments.

Figure 8:
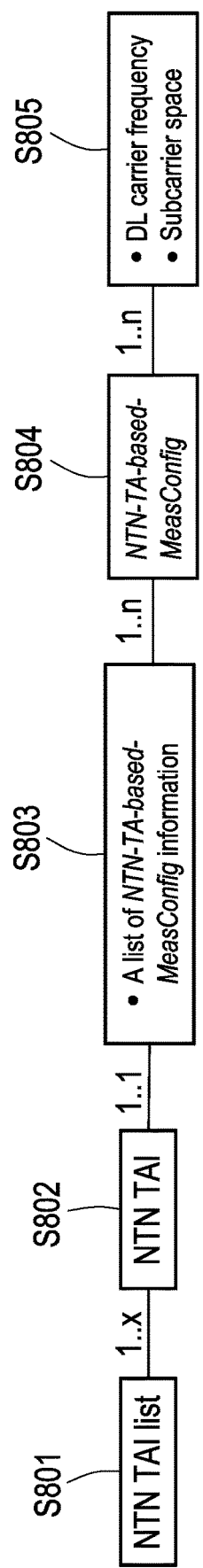
FIG. 8 illustrates a derivation of NTN-TA-based MeasConfig and its content according to an exemplary embodiment of the disclosure.

One implementation of the cell search and measurement configuration information could be using the parameter NTN-TA-based MeasConfig. FIG. 8 is a flow chart which shows a derivation of NTN-TA-based MeasConfig and its content. In step S801, the UE may receive or already possesses a NTN tracking area identifier (TAI) list which contains a list of mobile country codes (MCC), mobile network codes (MNC), and tracking area codes (TAC). From the NTA TAI list, in step S802, the UE may obtain a NTN TAI. In step S803, by using the NTN TAI, the UE may receive from its NTN serving cell the NTN-TA-based-MeasConfig associated with the NTN TAI of the NTN TAI list. The list of NTN-TA-based-MeasConfig includes one or more NTN-TA-based-MeasConfig, each NTN-TA-based-MeasConfig is associated with a carrier frequency. In step S804, the UE would obtain NTN-TA-based-MeasConfig. In step S805, the UE would obtain from NTN-TA-based-MeasConfig information related to DL carrier frequencies and the subcarrier spaces of the SSB frequency in order to perform a TN cell search and measurement.

Figure 9:
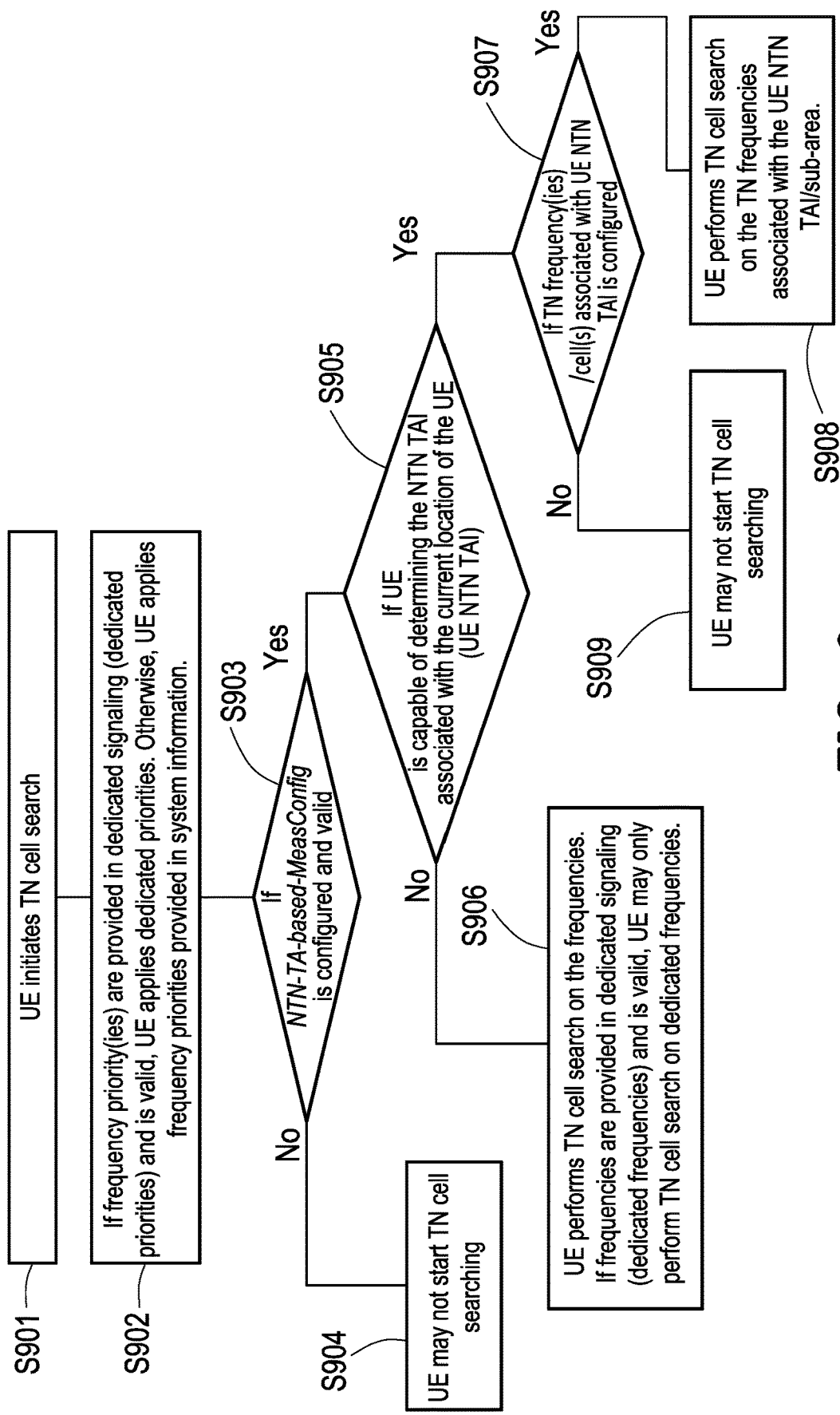
FIG. 9 illustrates a UE determining carrier frequencies of TN cells by using NTN-TA-based-MeasConfig according to an exemplary embodiment of the disclosure.

After receiving NTN-TA-based MeasConfig, the UE would be able to initiate a TN cell search and measurement procedure. FIG. 9 is a flow chart which shows a UE determining carrier frequencies of TN cells by using NTN-TA-based MeasConfig according to an exemplary embodiment of the disclosure. In step S901, the UE is assumed to have initiated a TN cell search. A UE may initiate a TN cell search under some circumstances such as when the UE is first powered on, when the UE has to switch to a different TN cell because of its mobility, or according to the configuration of cell reselection priorities. In step S902, if the UE is being provided with frequency priorities of neighboring TN cells via a dedicated signaling, the UE may apply the priorities configured by dedicated signaling to perform cell search and measurements of TN cells according to the frequency priorities associated with the frequencies, and ignore the priorities obtained from system information. If not, then the UE would perform a cell search and measurement procedure for a TN cell by applying the priorities obtained from the broadcasted system information. In step S903, the UE would have obtained NTN-TA-based-MeasConfig from either dedicated signaling or from broadcasted system information, and the UE would determine whether the NTN-TA-based-MeasConfig is valid and can be implemented. If not, then in step S904, the UE may not start a TN cell search and this iteration of the process would end. If yes, then the process proceeds from step S905. There may be a timer or an identity of the validity/applicable area of the NTN-TA-based-MeasConfig for the UE to determine whether the NTN-TA-based-MeasConfig is validity and applicable. When the timer expired or the validity/applicable area does not match with the location of the UE, the NTN-TA-based-MeasConfig is considered as not valid and cannot be implemented.

In step S905, if the UE is not capable of determining its UE NTA TAI which is the NTN TAI associated with the current location of the UE, then in step S906, the UE would perform a TN cell search and measurement procedure by applying one or more of the frequencies having the highest or higher priorities according to the frequency priorities. If the frequency priorities received from the dedicates signaling is deemed by the UE to be valid, then the UE may only perform TN cell search and measurement procedure according to the frequency priorities received from the dedicated signaling. If the UE is capable of determining its UE NTA TAI which is the NTN TAI associated with the current location of the UE, then in step S907, the UE would determine whether the frequencies of TN cell(s) associated with the UE NTN TAI has been configured. If yes, then in step S908, the UE may perform a TN cell search and measurement procedure based on the TN frequencies associated with the UE NTN TAI or the NTN sub-area. The NTN sub-area may be associated with one or more NTN TAI, or be associated with a geographic area represented in a form of latitude and longitude coordination, or be associated with one or more NTN cell identities. If not, then in step S909, the UE may not start a TN cell search and this iteration of the process would end.

Figure 10:
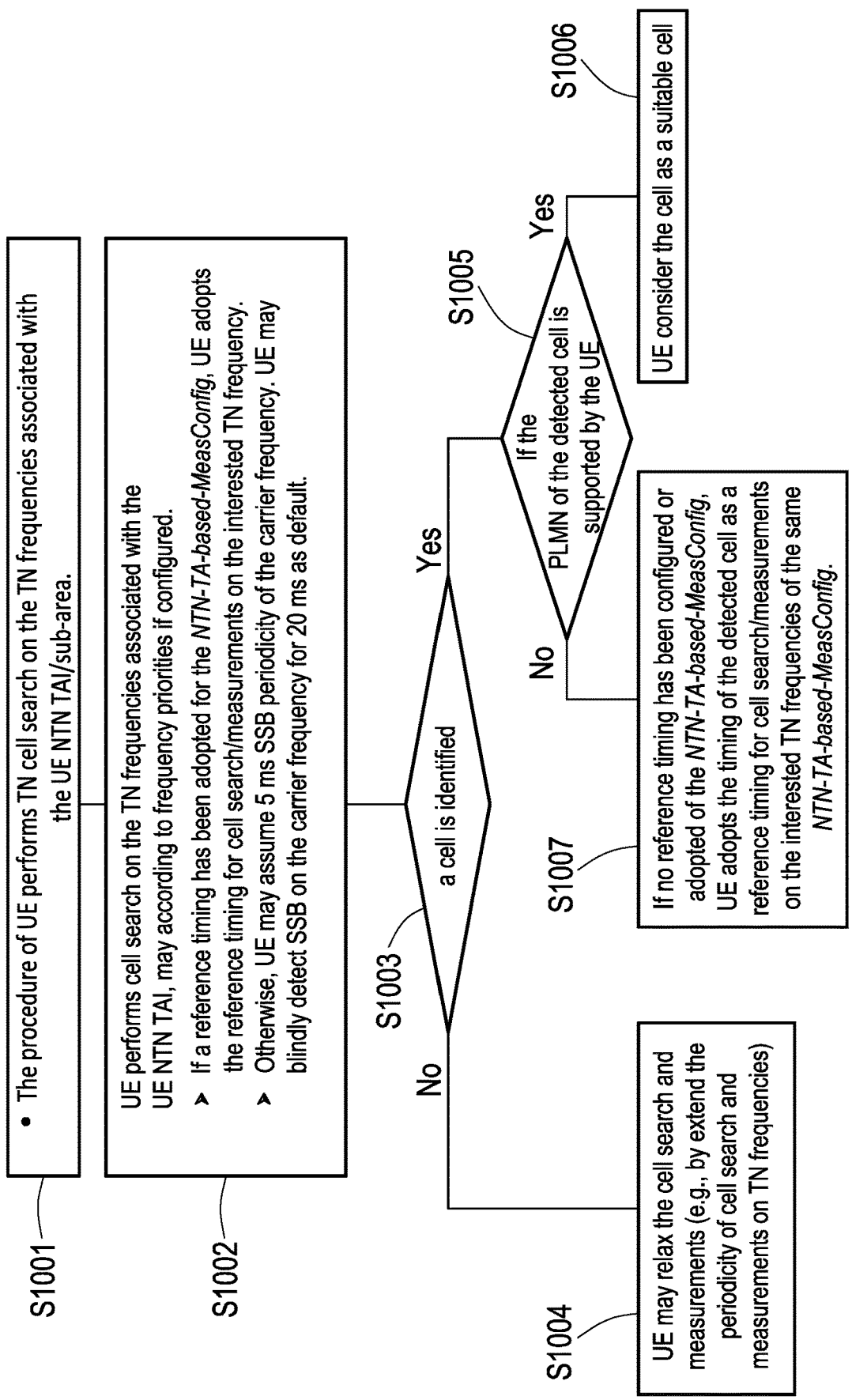
FIG. 10 illustrates a UE searching for a neighboring TN cell while adopting a reference timing according to an exemplary embodiment of the disclosure.

FIG. 10 illustrates a UE searching for a neighboring TN cell while adopting a reference timing according to an exemplary embodiment of the disclosure. In step S1001, the UE would initiate a procedure to search for a neighboring TN cell by performing cell search and measurements on the carrier frequencies of TN cells associated with the UE NTN TAI or a NTN sub-area. In step S1002, the UE would perform a cell search and measurements on carrier frequencies of TN cells identified to be associated with the UE NTN TAI according to the priority of frequencies list if the carrier frequencies of the TN cells have been configured. If a reference timing has been adopted for the NTN-TA-based-MeasConfig, then the UE adopts the reference timing for performing a cell search and measurement procedure for the carrier frequencies. Otherwise, the UE may assume the carrier frequency of the identified neighboring TN cell to have a 5 ms SSB periodicity, and the UE may blindly detect for a SSB on the carrier frequency.

In step S1003, the UE would determine whether a neighboring TN cell f has been detected after performing the cell search and measurements on a carrier frequency. If no cell from the frequencies included in the NTN-TA-based-MeasConfig has been detected, then in step S1004, the UE may relax its cell search and measurement criteria such as by widening the window for performing a cell search and measurement procedure on the carrier frequency of the identified neighboring TN cell. If the UE has detected a cell in step S1003, then in step S1005, the UE would determine if the PLMN of the detected cell is supported by the UE. If yes, then in step S1006, the UE would consider the detected cell as a suitable cell. If no, then in step S1007, UE may adopts the timing of the detected cell from step S1003 as a reference timing for subsequent cell search and measurement procedures on the carrier frequencies of TN cells from the same NTN-TA-based-MeasConfig if no reference timing has been configured or adopted for the NTN-TA-based-MeasConfig. The UE may further perform cell search and measurements as in step S1002 on other carrier frequencies according to the frequency priorities associated with the TN frequencies included in the NTN-TA-based-MeasConfig.

Figure 11:
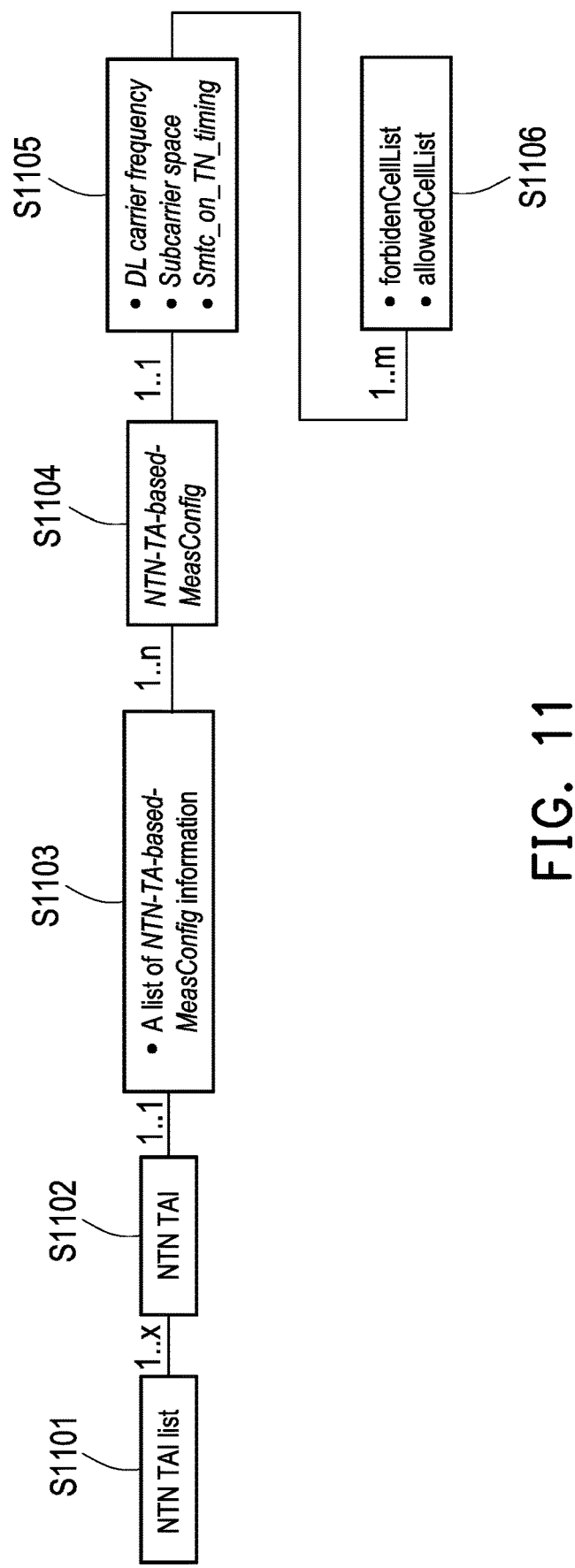
FIG. 11 illustrates an alternative embodiment of FIG. 8 according to an exemplary embodiment of the disclosure.

FIG. 11 shows an alternative embodiment of FIG. 8. The steps S1101~S1104 of FIG. 11 are the same as steps S801~S804 of FIG. 8, but FIG. 11 contains an additional step, step S1105. In step S1105, the UE may further determine from the NTN-TA-based-MeasConfig at least one cell identity of a neighboring TN cell. The cell identity of the neighboring TN cell could be a mean to designate the UE to only select a specific neighboring TN cell e.g., for network issues such as load balancing. The cell identity of the neighboring TN cell could be a part of an allowed cell list (i.e. parameter allowedCellList), and only cells from the allowed cell list could be (re-)selected by the UE. Furthermore, in step S1106 the UE may obtain from the NTN-TA-based-MeasConfig a forbidden cell list (i.e. parameterforbiddenCeilList) to prevent the UE to (re-)select specific cells that are reserved for specific purposes.

Figure 12:
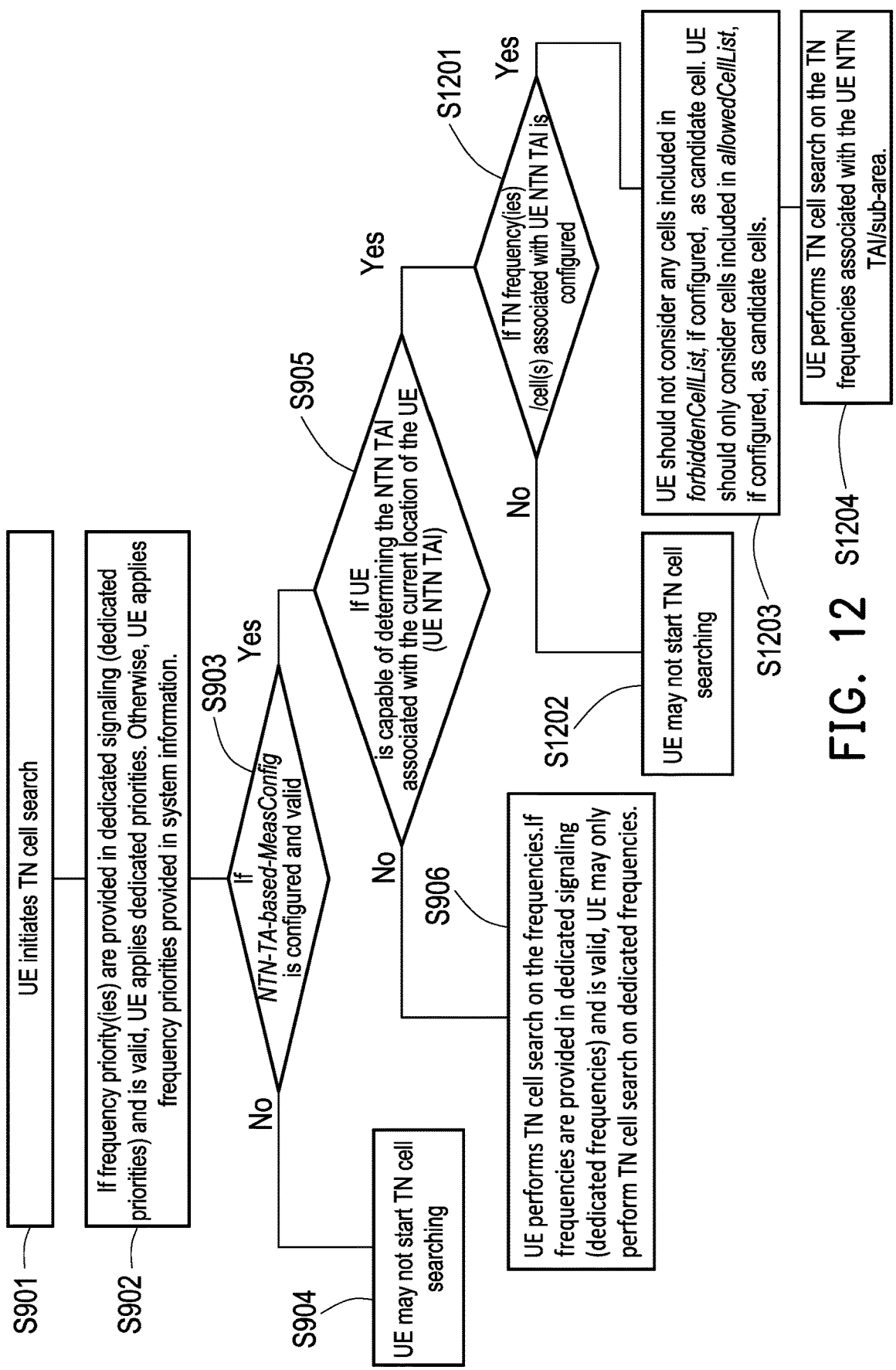
FIG. 12 illustrates an alternative embodiment of FIG. 9 according to an exemplary embodiment of the disclosure.

FIG. 11 as a modified version of FIG. 8 would affect the embodiment of FIG. 9. FIG. 12 illustrates an alternative embodiment of FIG. 9. FIG. 12 is a flow chart which shows a UE determining carrier frequencies of TN cells by using NTN-TA-based MeasConfig in the same manner as the embodiment except for step S1203 and S1204. In step S1201, the UE would determine whether the frequencies of TN cell(s) associated with the UE NTN TAI has been configured. If not, then in step S1202, the UE may not start a TN cell search and this iteration of the process would end. If yes, then in step S1203, the UE would not consider any TN cells included in the forbiddenCellList, if configured, as a candidate cell and the UE would only consider cells included in allowedCellList, if configured, as candidate cells. In step S1204, the UE may perform a TN cell search and measurement procedure based on the TN frequencies associated with the UE NTN TAI or with NTN sub-area.

Figure 13:
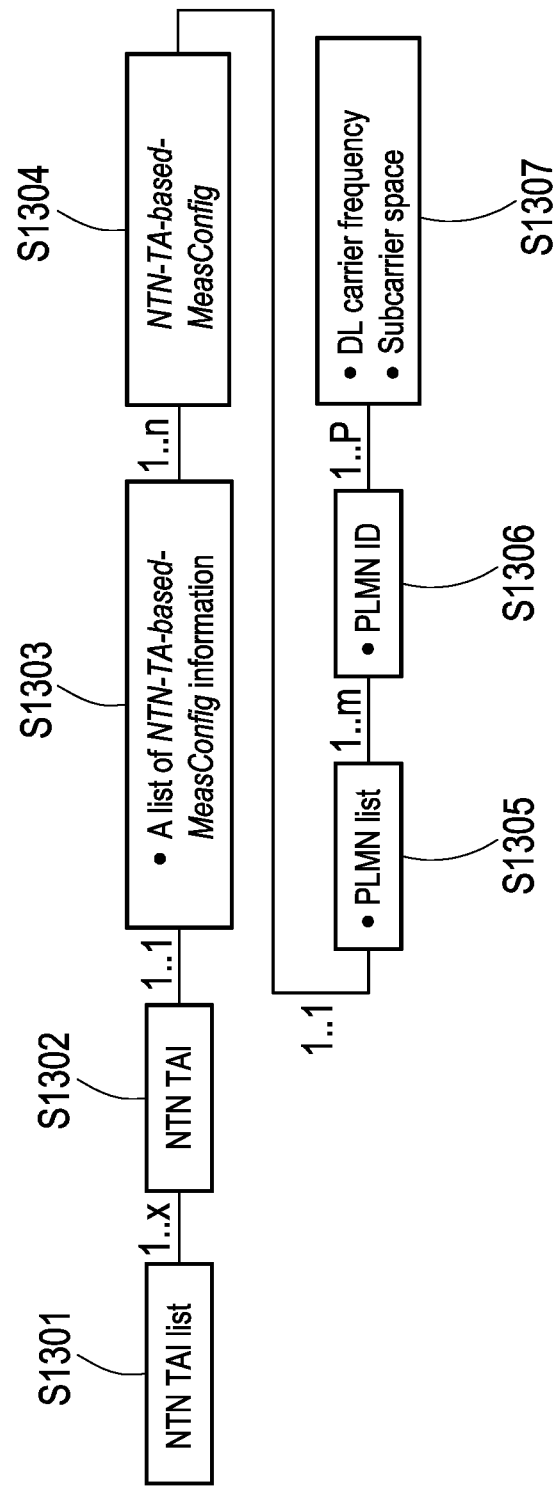
FIG. 13 illustrates an alternative embodiment of FIG. 10 according to an exemplary embodiment of the disclosure.

FIG. 13 illustrates an alternative embodiment of FIG. 8. For the exemplary embodiment of FIG. 13, the NTN-TA-based-MeasConfig may further include a PLMN list which contains at least one PLMN identity. If the UE has received cell search and measurement information as previously described, the UE would first need to identify the best cell among the possible carrier frequencies of TN cells from the NTN-TA-based-MeasConfig. Subsequently, the UE may obtain the system information from the best cell and may provide the PLMN of the cell to non-access stratum (NAS) layer to determine whether a cell is a suitable cell. If a UE has been configured with equivalent home PLMN (EHPLMN) or equivalent resident (ERPLMN) or preferred PLMN, then the UE could utilize such information to determine whether to initiate TN cell search. The procedure of FIG. 13 is as follows. In step S1301, the UE may receive or already possesses a NTN TAI list which contains a list of one or more NTN TAI. From the NTA TAI list, in step S1302, the UE may obtain a NTN TAI (e.g., the NTN TAI associated with the current UE location). In step S1303, by using the NTN TAI, the UE may obtain a list of NTN-TA-based-MeasConfig information associated with the NTN TAI. The list of NTN-TA-based-MeasConfig includes one or more NTN-TA-based-MeasConfig, each NTN-TA-based-MeasConfig is associated with a carrier frequency. In step S1304, the UE would obtain the NTN-TA-based-MeasConfig associated with the interested carrier frequency if configured for performing cell search and measurements. The NTN-TA-based-Meas-MeasConfig further include a PLMN list which consists of one or more PLMN IDs. Thus, in step S1305, the UE would obtain the PLMN list from the NTN-TA-based-MeasConfig, and in step S1306, the UE would obtain one or more PLMN IDs from the NTN-TA-based-MeasConfig. Each PLMN ID is associated with one or more carrier frequency information that the cells supporting the PLMN ID is deployed. The carrier frequency information consists of a DL carrier frequency and a subcarrier space of the SSB frequency that the cells supporting the PLMN ID is deployed. In step S1307, the UE would obtain the DL carrier frequency and the subcarrier space of the SSB frequency in order to perform a TN cell search and measurement.

Figure 14:
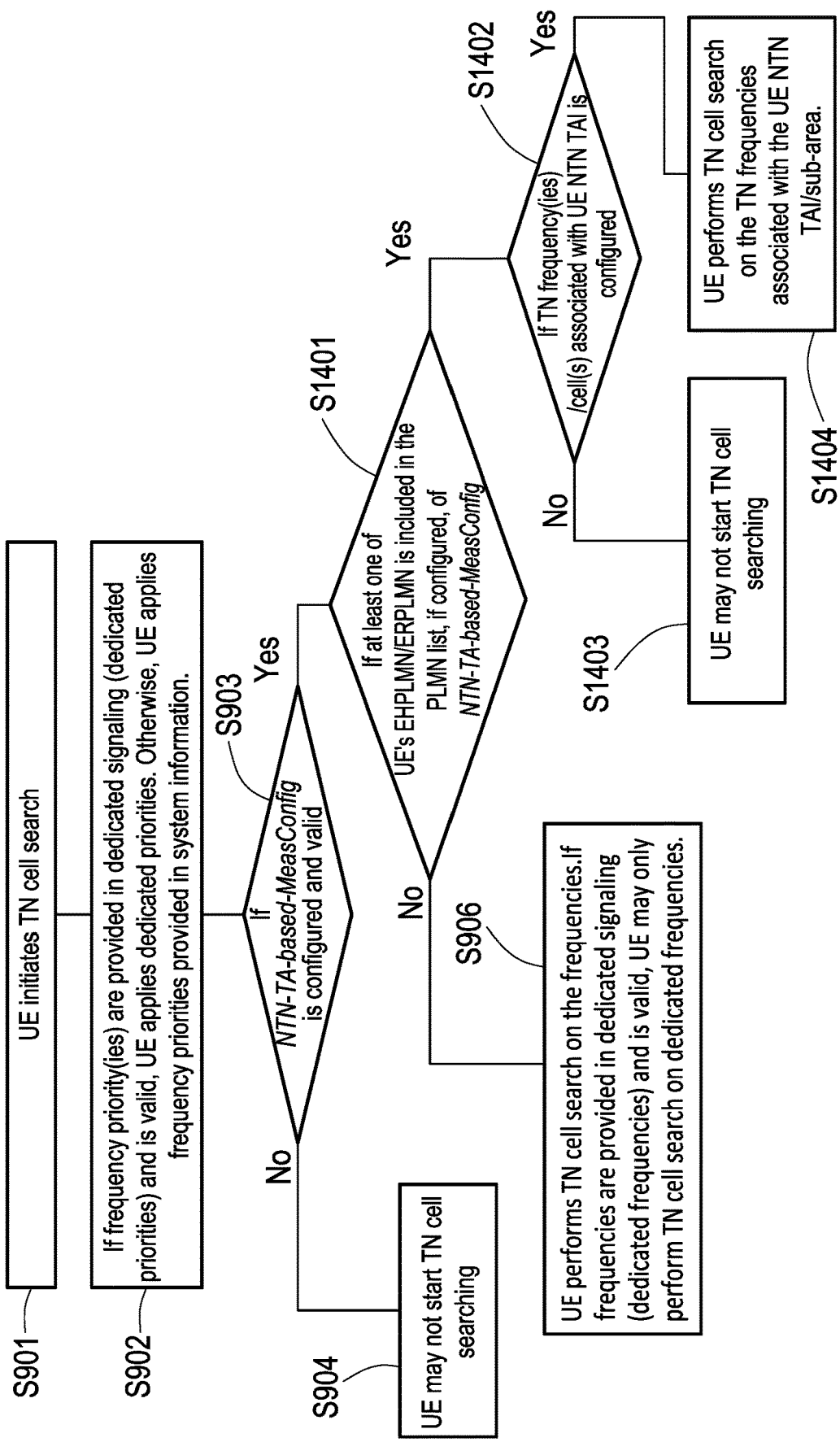
FIG. 14 illustrates an alternative embodiment of FIG. 12 according to an exemplary embodiment of the disclosure.

FIG. 14 shows the effect of the embodiment of FIG. 13 to the embodiment of FIG. 9. FIG. 14 is an updated flow chart which shows a UE determining carrier frequencies of TN cells by using NTN-TA-based MeasConfig to obtain EHPLMN or ERPLMN. The steps of FIG. 14 are the same as the steps of FIG. 9 except for step S1401. If the UE is capable of determining its UE NTN TAI which is the NTN TAI associated with the current location of the UE, then in step S1401, the UE would determine if at least one of UE's EHPLMN or ERPLMN is included in the PLMN list of the NTN-TA-based-MeasConfig if such information is available in NTN-TA-based-MeasConfig. If yes, then in step S1402, the UE would determine whether the frequencies of TN cell(s) associated with the UE NTN TAI has been configured. If yes, then in step S1404, the UE may perform a cell search and measurement procedure based on the TN frequencies associated with the UE NTN TAI or the NTN sub-area. If not, then in step S1403, the UE may not start a TN cell search and this iteration of the process would end.

Figure 15:
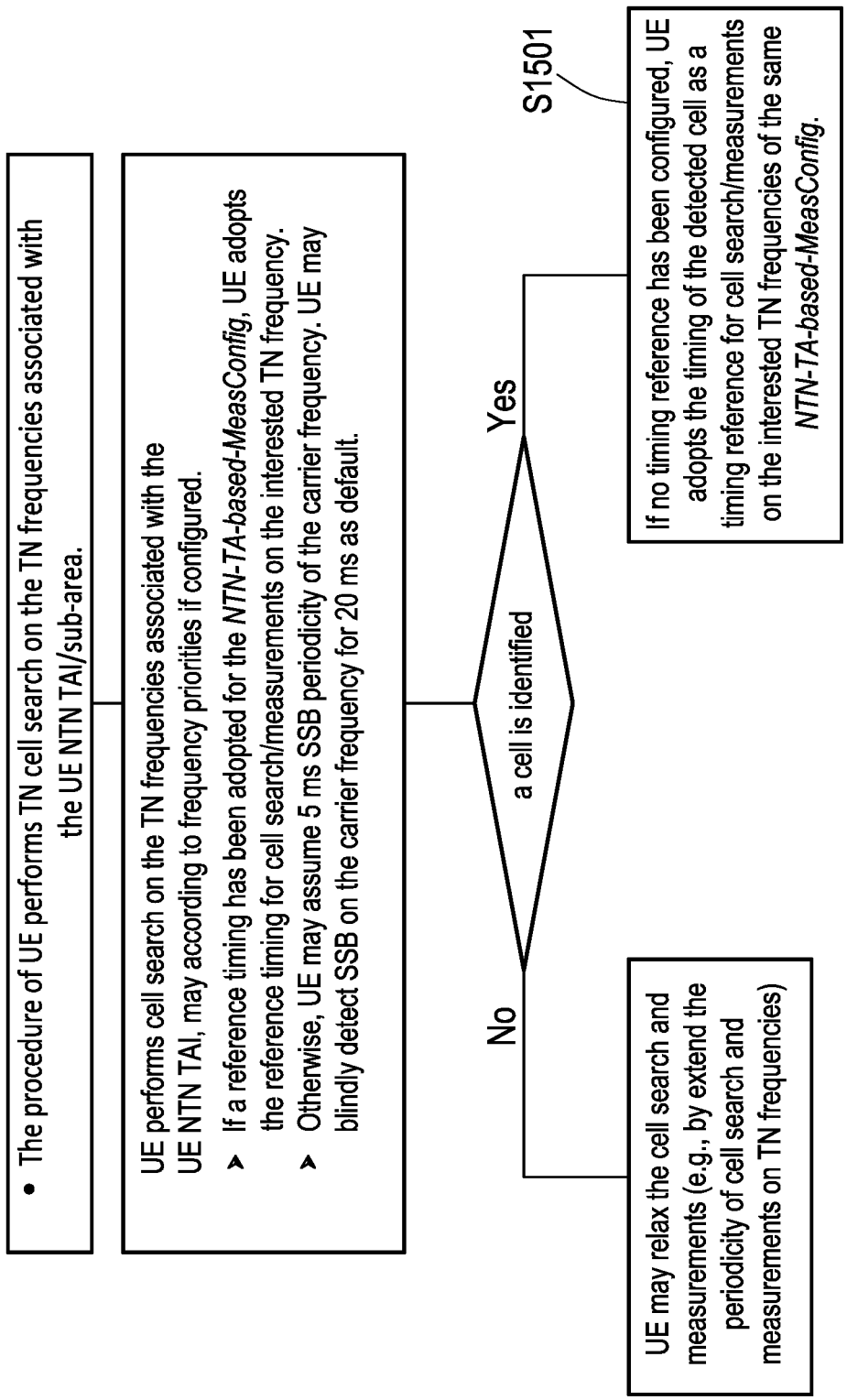
FIG. 15 illustrates an alternative embodiment of FIG. 10 according to an exemplary embodiment of the disclosure.

FIG. 15 illustrates an alternative embodiment of FIG. 10 based on the effect of the embodiment of FIG. 13 on the embodiment of FIG. 10. The steps of FIG. 15 are the same as the steps of FIG. 10 except for step S1801. If the UE has detected the cell as in step S1303, then in step S1801, the UE would adopt the timing of the detected cell as a reference timing for subsequent cell search and measurement procedures on the carrier frequencies of TN cells from the same NTN-TA-based-MeasConfig if no reference timing has been configured or adopted according to the NTN-TA-based-MeasConfig.

Figure 16:
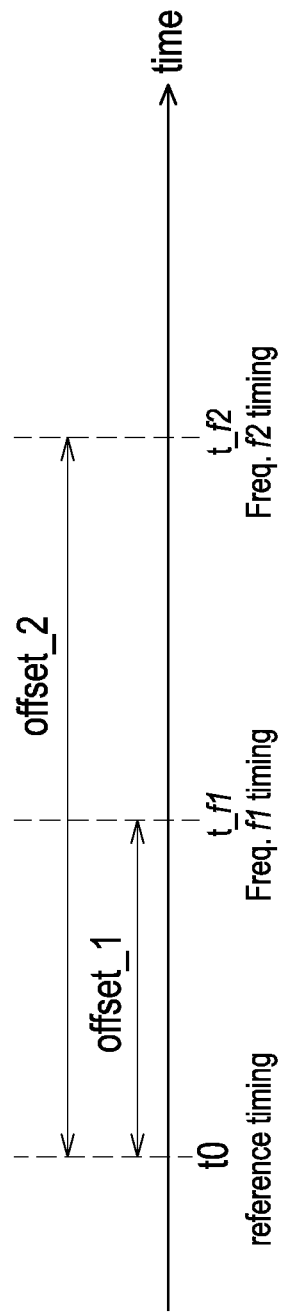
FIG. 16 illustrates the utilization of a reference timing as the reference timing of SMTC for neighboring TN cells according to an exemplary embodiment of the disclosure.

The disclosure will proceed to describe the second set of exemplary embodiments where a UE will perform cell search and measurements by using SMTC. The disclosure provides a concept of using virtual reference timing or anchor reference timing as the reference timing for SMTC for neighboring TN cells. Thus, the offset value of a SMTC could be calculated based on the virtual reference timing instead of being based on a serving cell timing. FIG. 16 illustrates the utilization of a virtual reference timing as the reference timing. As shown in FIG. 16, since t0 is the reference timing, a TN cell with carrier frequency f1 has the SMTC offset value offset_1, and the TN cell with carrier frequency f2 has the SMTC offset value offset_2 instead of being based on the timing of the serving cell.

Figure 17:
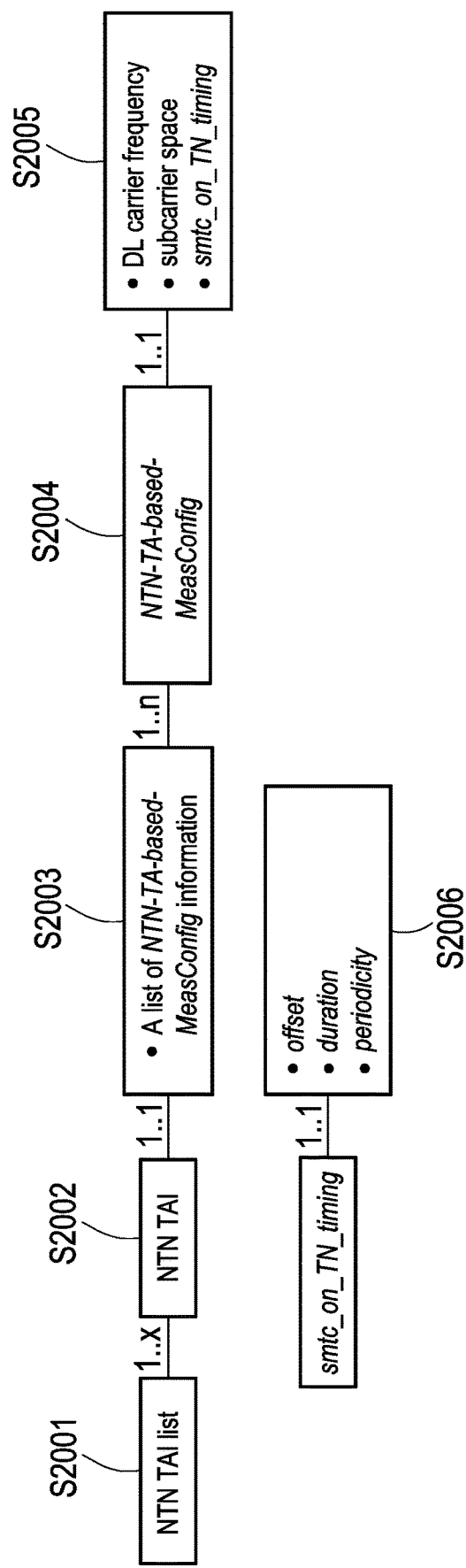
FIG. 17 illustrates using NTN-TA based configuration with SMTC with according to an exemplary embodiment of the disclosure.

FIG. 17 shows the cell search and measurement configuration with SMTC. In this exemplary embodiment, each NTA-TA-based-MeasConfig would be further associated with one or more smt_on_TN_timing. Each smtc_on_TN_timing further contains one or more of the parameters including an offset, a duration, and a periodicity. The offset parameter indicates an offset to the reference timing. The duration parameter indicates a length of a measurement duration during which reference signals such as synchronization signal block (SSB) are to be received. The periodicity parameter indicates a periodicity for a UE to receive the reference signals. The value of the offset could be a zero, a positive value, or a negative value. The unit of the offset value could be ms or time slots. As shown in FIG. 17, steps S2001 and S2002 and S2003 are the same as steps S1101, S1102, and S1103. In step S2004, the UE may obtain NTN-TA-based MeasConfig. In step S2005, the parameters associated with a NTN-TA-based-MeasConfig including a DL carrier frequency and a subcarrier space of the SSB frequency and a smtc_on_TN_timing could be retrieved in order to perform a TN cell search and measurement. The smtc_on_TN_timing includes the fields of an offset, a duration, and a periodicity. Thus, in step S2006, the values of the parameters offset, a duration, and a periodicity could further be obtained from smtc_on_TN_timing.

Figure 18:
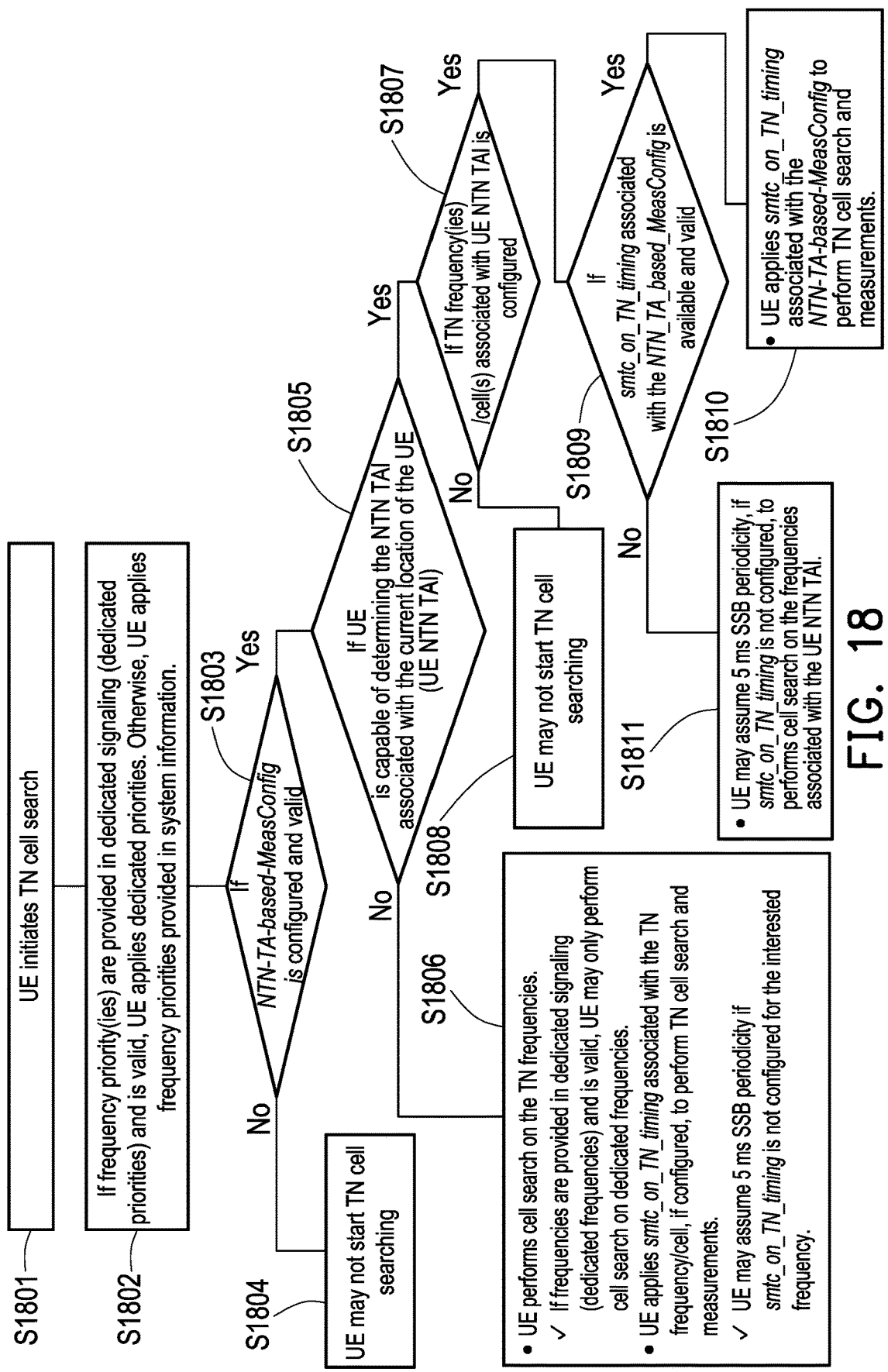
FIG. 18 illustrates a UE determining carrier frequencies of TN cells by using NTN-TA-based-MeasConfig according to an exemplary embodiment of the disclosure.

FIG. 18 illustrates a UE determining carrier frequencies of TN cells by using NTN-TA-based-MeasConfig according to an exemplary embodiment of the disclosure. In step S1801, the UE is assumed to have initiated a TN cell search. In step S1802, if the UE is being provided with frequency priorities for cell search and measurements via a dedicated signaling, the UE may apply the frequency priorities for performing a cell search and measurements for a TN cell. If not, then the UE would perform a cell search and measurement procedure for a TN cell based on the frequency priorities obtained from the system information. If frequency priorities from both dedicated signaling and from the broadcasted system information exist, then the frequency priorities obtained from the dedicated signaling would take precedence. In step S1803, the UE would determine whether the NTN-TA-based-MeasConfig is valid and can be implemented. If not, then in step S1804, the UE may not start a TN cell search and this iteration of the process would end. If yes, then the process proceeds from step S1805.

In step S1805, if the UE is not capable of determining its UE NTN TAI which is the NTN TAI associated with the current location of the UE, then in step S1806, the UE would perform a cell search and measurement procedure by applying the frequency priorities. If the frequency priorities received from the dedicates signaling is deemed by the UE to be valid, then the UE may only perform cell search and measurement procedure according to the frequency priorities received from the dedicated signaling. Once having identified an interested frequency according to the frequency priorities, the UE may further apply the smtc_on_TN timing parameter associated with the frequency to perform cell search and measurements if the smtc_on_TN timing has been configured. The UE may assume a 5 ms SSB periodicity to perform cell search and measurements if the smtc_on_TN timing associated with the frequency has not been configured.

If the UE is capable of determining its UE NTA TAI which is the NTN TAI associated with the current location of the UE, then in step S1807, the UE would determine whether the frequencies of TN cell(s) associated with the UE NTN TAI has been configured. If not, then in step S1808, the UE may not start a TN cell search and this iteration of the process would end. If yes, then in step S1809, the UE would determine if smtc_on_TN timing associated with the NTN-TA-based-MeasConfig associated with the frequency is available and valid. If yes, then in step S1810, the UE may apply the smtc_on_TN timing associated with the NTN-TA-based-MeasConfig to perform a cell search and measurement procedure. If no, then in step S1811, the UE may assume a 5 ms SSB periodicity if a smtc_on_TN_timing associated with a frequency has not been configured to perform a cell search on the frequencies associated with the UE NTN TAI.

Figure 19:
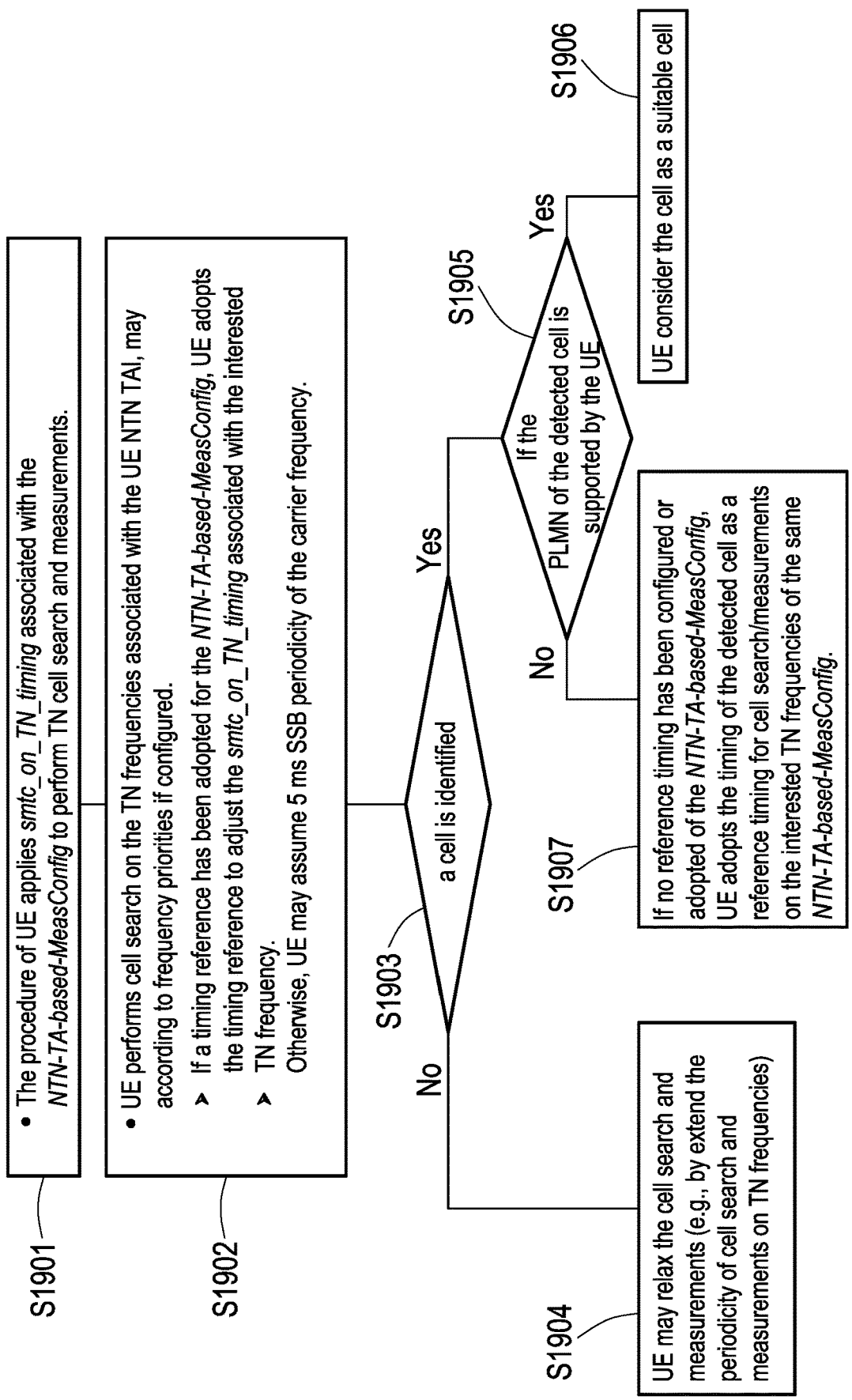
FIG. 19 illustrates a UE searching for a neighboring TN cell while adopting a reference timing according to an exemplary embodiment of the disclosure.

FIG. 19 illustrates a UE searching for a neighboring TN cell while adopting a timing configuration from the smtc_on_TN_timing parameter according to an exemplary embodiment of the disclosure. In step S1901, the UE would apply the smtc_on_TN_timing associated with the NTN-TA-based-MeasConfig associated with a carrier frequency to perform cell search and measurements of the carrier frequency. In step S1902, the UE would initiate a procedure to search for a neighboring TN cell by performing cell search and measurements on the carrier frequencies of TN cells associated with the UE NTN TAI or a NTN sub-area. In step S1902, the UE would perform a cell search and measurements on carrier frequencies of TN cells identified to be associated with the UE NTN TAI according to the frequency priorities if the frequency priorities has been configured. If a reference timing has been adopted according to the NTN-TA-based-MeasConfig, then the UE adopts the reference timing to adjust the smtc_on_TN timing associated with the carrier frequency for performing a cell search and measurement procedure for the carrier frequencies. Otherwise, the UE may assume a 5 ms SSB periodicity of the carrier frequency.

In step S1903, the UE would determine whether a cell has been detected after performing the cell search and measurement procedure. If no cell has been detected, then in step S1904, the UE may relax its cell search and measurement criteria such as by widening the window for performing a cell search and measurement procedure on the carrier frequency. If the UE has detected a cell in step S1903, then in step S1905, the UE would determine if the PLMN of the detected cell is supported by the UE. If yes, then in step S1906, the UE would consider the detected cell as a suitable cell. In step S1907, if no reference timing has been configured or adopted for the NTN-TA-based-MeasConfig, UE would adopts the timing of a detected cell as a reference timing for cell search and measurements on the carrier frequencies of the same NTN-TA-based-MeasConfig.

Figure 20:
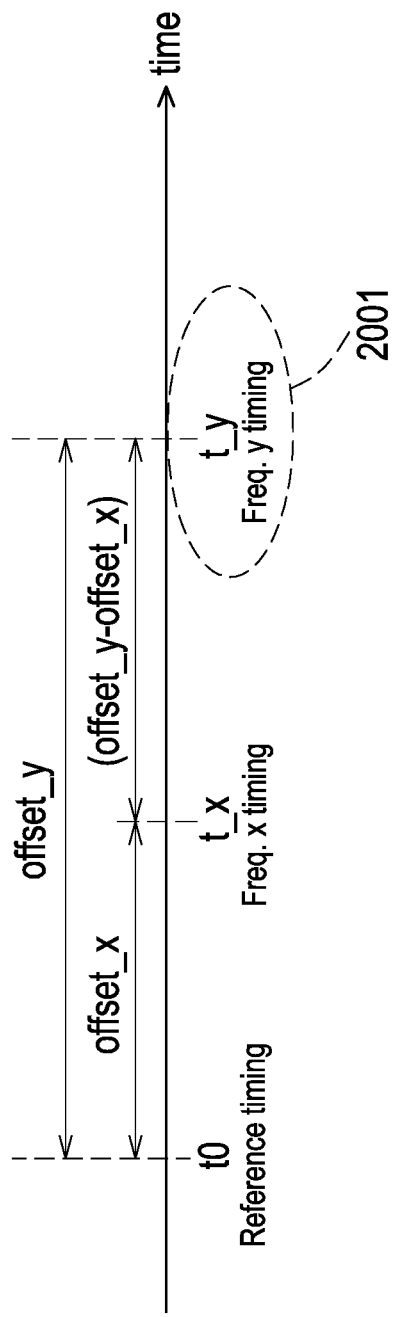
FIG. 20 illustrates a UE applying an offset value to a timing configuration according to an exemplary embodiment of the disclosure.

When performing cell search and measurements of a carrier frequency of the same NTN-TA-based-MeasConfig, the UE may adjust the timing configuration of the carrier frequency based on the reference timing and the smtc_on_TN_timing associated with the carrier frequency. FIG. 20 shows the concept of a UE applying an offset value adjustment. Assuming that a UE has identified an interested carrier frequency y 2301, and the UE has to apply an adjusted timing configuration (i.e., an executive timing configuration) to perform a cell search and measurement procedure for frequency y 2301 as the interested frequency. When a cell of a first frequency x included in a NTN-TA-based-MeasConfig is detected and there has no reference timing been configured or adopted for the NTN-TA-based-MeasConfig, the timing of the cell of the first frequency x is adopted as the reference timing associated with the NTN-TA-based-MeasConfig. If the cell of the first frequency x is not a suitable cell, the UE may further perform cell search and measurements of a second frequency y by applying the reference timing to adjust the applicable timing for cell search and measurements of the second frequency y. The UE may first obtain smtc_on_TN_timing_x which is the smtc_on_TN_timing associated with the first carrier frequency x. The smtc_on_TN_timing_x may include the parameter set {offset_x, duration_x, periodicity_x}. Next, the UE may obtain smtc_on_TN_timing_y which is the smtc_on_TN_timing associated with a second frequency y 2301. The smtc_on_TN_timing_y may include the parameters set {offset_y, duration_y, periodicity_y}. The UE then adjust the offset value for performing cell search and measurements on the second frequency y by calculating the offset difference between smtc_on_TN_timing_y and the reference timing (i.e., the difference between offset_y and offset_x in this case) and generate an executive timing configuration for the second frequency y. The executive timing configuration includes the values {(offset_y−offset_x), duration_y, periodicity_y} associated with parameters offset, duration, and periodicity so as for the UE to perform a cell search and measurement procedure of the second frequency y based on the executive timing configuration.

Figure 21:
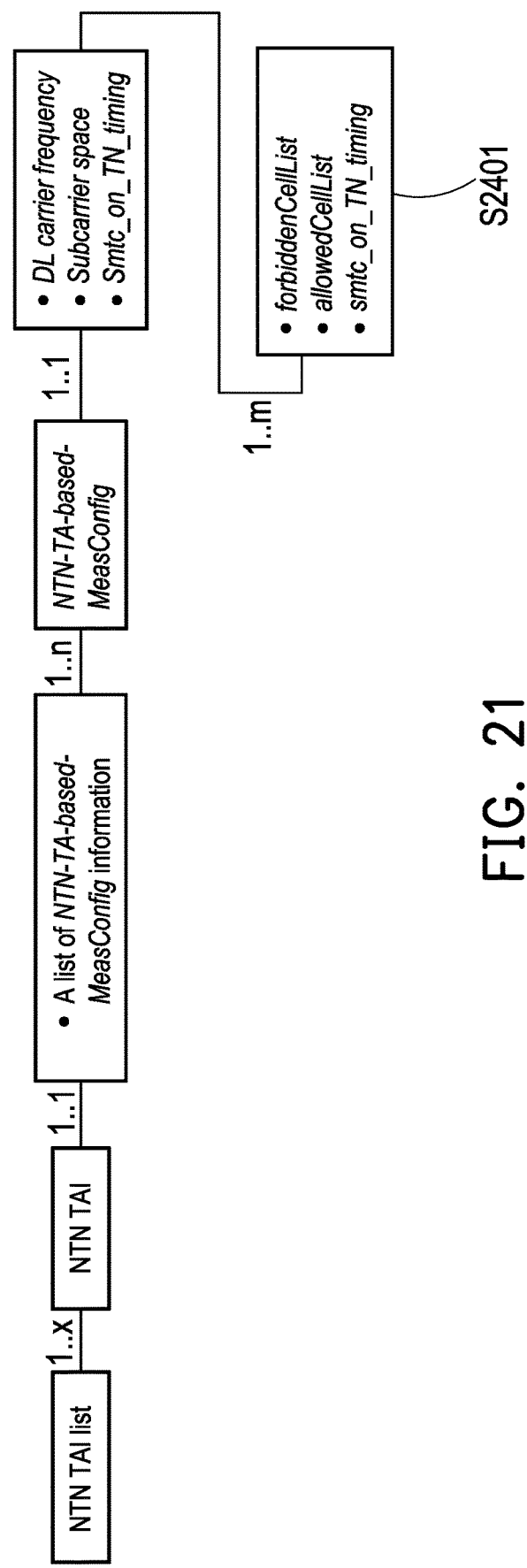
FIG. 21 illustrates a derivation of NTN-TA-based MeasConfig and its content according to an exemplary embodiment of the disclosure.

For the second set of exemplary embodiments, the NTN-TA-based MeasConfig may further include at least one cell identity of a TN cell. The cell identity of the neighboring TN cell could be a part of an allowed cell list (i.e. parameter allowedCellList), and only cells from the allowed cell list could be (re-)selected by the UE. Furthermore, the NTN-TA-based-MeasConfig may further include a forbidden cell list (i.e. parameter forbiddenCellList) to prevent the UE to (re-)select specific cells that are reserved for specific purposes. FIG. 21 illustrates the inclusion of cell lists in NTN-TA-based MeasConfig. The embodiment of FIG. 21 is similar to the embodiment of FIG. 11, but NTN-TA-based MeasConfig may further include smtc_on_TN_timing (S2401).

Figure 22:
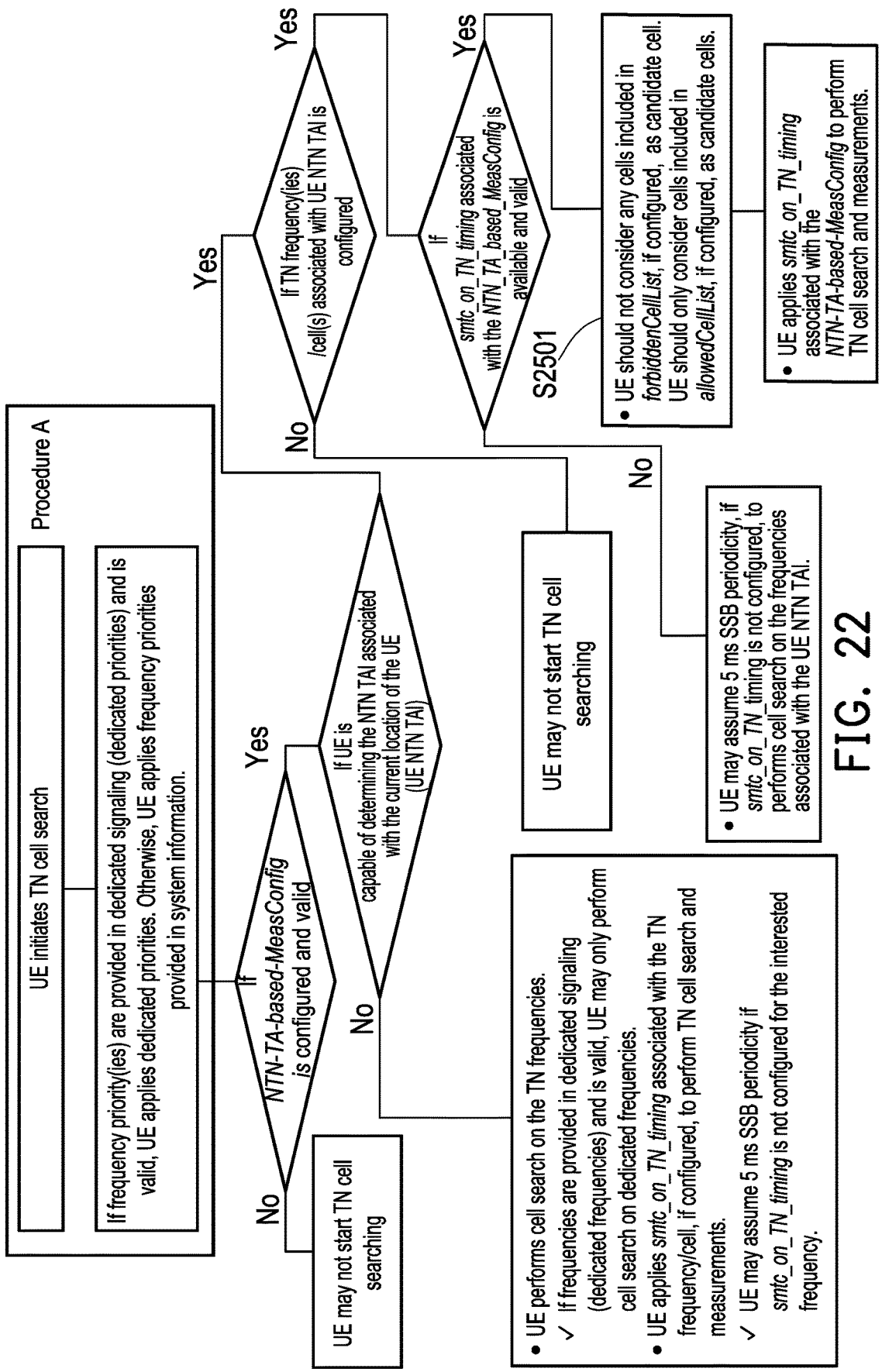
FIG. 22 illustrates an alternative embodiment of the UE determining carrier frequencies of TN cells by using NTN-TA-based-MeasConfig based on the change of FIG. 21.

FIG. 22 illustrates an alternative embodiment of the embodiment of FIG. 18 by incorporating the additional feature of the cell list as described in the embodiment of FIG. 21. In FIG. 22, the steps are the same as FIG. 18 except for step S2501. In step S2501, the UE would not consider any cell included in forbiddenCellList as a candidate TN cell if such list has been configured, and the UE would only consider any cell included in the allowedCellList as a candidate TN cell if such list has been configured. Thus, if smtc_on_TN_timing associated with NTN-TA-based-MeasConfig has been deemed as being available and valid, the UE would consider the cell lists when considering its possible candidate cells.

Figure 23:
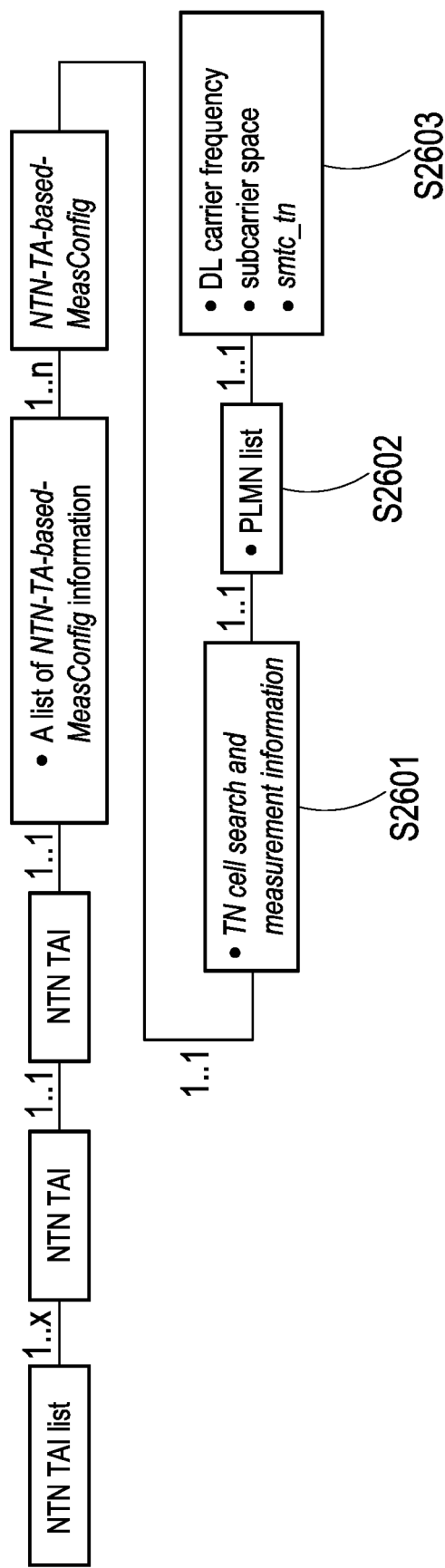
FIG. 23 illustrates an addition to NTN-TA-based MeasConfig according to an exemplary embodiment of the disclosure.

For the second set of exemplary embodiments, the NTN-TA-based MeasConfig may further include a PLMN list of neighboring TN cells, and the PLMN list would include at least one PLMN identity. Such concept is shown in FIG. 23 which illustrates obtaining a TN cell search and measurement information S2601 from a list of TN cell search and measurement information, and the list of TN cell search and measurement information could be a list of NTN-TA-based-MeasConfig information. From the TN cell search and measurement information, in step S2601, the UE may obtain a PLMN list. In step S2603, in addition to obtaining a DL carrier frequency of a subcarrier space, the UE may further obtain smtc_on_TN_timing for a neighboring TN cell on the PLMN list. If the UE has received cell search and measurement information, the UE would first need to identify the best cell according to the NTN-TA-based-MeasConfig. Subsequently, the UE may obtain the system information from the best cell and provide the PLMN to non-access stratum (NAS) layer for PLMN selection, if necessary, to determine whether a cell is a suitable cell. If a UE has been configured with equivalent home PLMN (EHPLMN) or equivalent resident (ERPLMN) or preferred PLMN, then the UE could utilize such information to determine whether to initiate TN cell search. If none of the PLMN included in the NTN-TA-based-MeasConfig is supported by the UE, the UE may not start cell search and measurement procedure accordingly.

Figure 24:
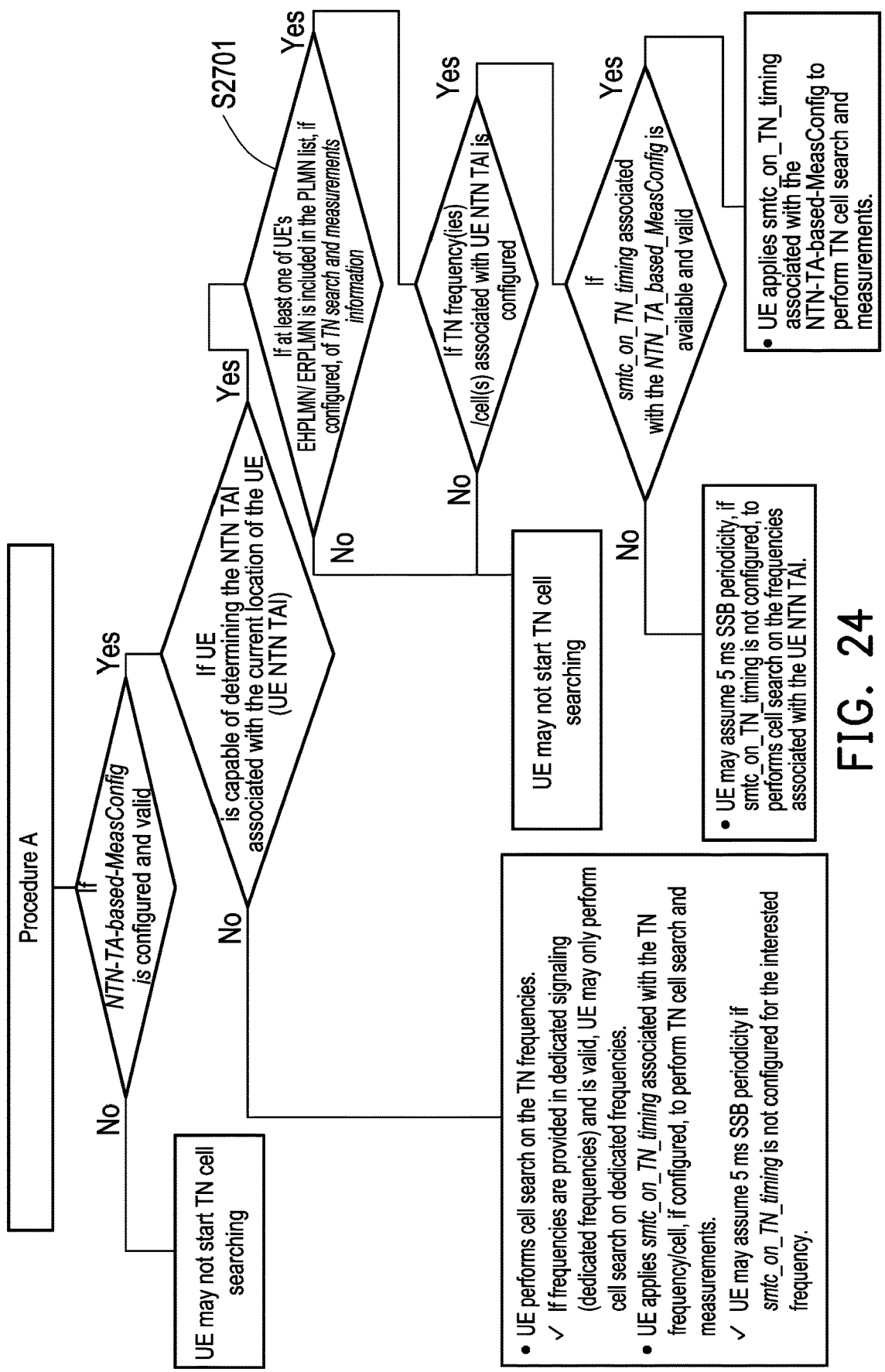
FIG. 24 illustrates an alternative embodiment of the UE determining carrier frequencies of TN cells by using NTN-TA-based-MeasConfig based on the change of FIG. 23.

Assuming that the PLMN list is available from a list of NTN-TA-based-MeasConfig information, the exemplary embodiment of FIG. 18 could be modified accordingly, and the modified exemplary embodiment of FIG. 18 is shown in FIG. 24. The steps of FIG. 24 are the same as the steps of FIG. 18 except for step S2701. In step S2701, the UE would determine if at least one of the PLMN supported by the UE (e.g., UE's EHPLMN or ERPLMN) is included in the PLMN list (e.g. S2602) if such list is available from the TN search and measurement information (e.g. S2601). If none of the PLMN supported by the UE is included in the PLMN list, then the UE would not start cell search and measurements. Otherwise, the UE would continue the rest of the procedure in FIG. 18.

Figure 25:
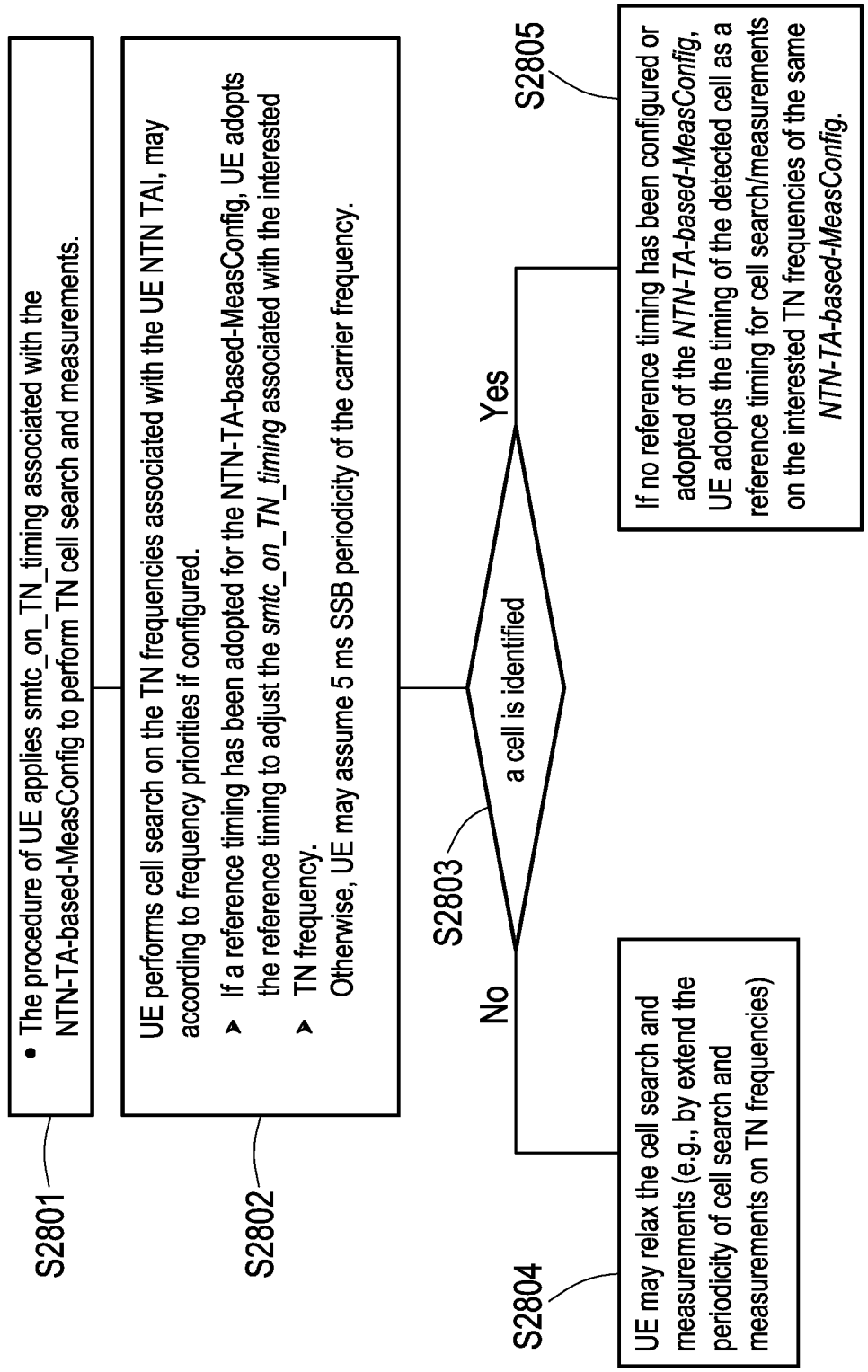
FIG. 25 illustrates an alternative embodiment of a UE using NTN-TA based configuration with SMTC based on the change of FIG. 23 with according to an exemplary embodiment of the disclosure.

FIG. 25 shows an alternative embodiment of a UE using cell search and measurement configuration with SMTC based on the change of FIG. 23 with according to an exemplary embodiment of the disclosure. In step S2801, the UE would apply smtc_on_TN_timing associated with NTN-TA-based-MeasConfig to perform TN cell search and measurements. In step S2802, the UE would perform a cell search and measurements on carrier frequencies of TN cells identified to be associated with the UE NTN TAI according to the frequency priorities if the frequency priorities have been configured. If a reference timing has been adopted for the NTN-TA-based-MeasConfig, then the UE adopts the reference timing to adjust the smtc_on_TN_timing associated with the interested carrier frequencies. Otherwise, the UE may assume the interested carrier frequency to have a 5 ms SSB periodicity.

In step S2803, the UE would determine whether a neighboring TN cell has been detected after performing the cell search and measurement procedure. If no cell has been detected, then in step S2804, the UE may relax its cell search and measurement criteria such as by widening the window for performing a cell search and measurement procedure on the carrier frequency of the identified neighboring TN cell. If the UE has detected the cell in step S2803, then in step S2805, if no reference timing has been configured or adopted for the NTN-TA-based-MeasConfig, UE would adopt the timing of the first detected cell as a reference timing for cell search and measurements on the carrier frequencies of the same NTN-TA-based-MeasConfig.

In view of the aforementioned descriptions, the present disclosure is suitable for being used in a 5G communication system beyond and is able to allow a UE to perform a cell search and measurement in a power efficient way when performing NTN mobility.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a user equipment (UE) for implementing non-terrestrial network (NTN) mobility comprising:
receiving a cell search and measurement configuration from a NTN, the cell search and measurement configuration comprises information of at least one carrier frequency and at least one NTN tracking area (TA) information associated with the carrier frequency for performing a cell search and measurement procedure, wherein the cell search and measurement configuration relates to a cell belonging to a terrestrial network (TN);
initiating the cell search and measurement procedure to search for the cell belonging to the TN; and
performing the cell search and measurement procedure by applying the cell search and measurement configuration.

2. The method of claim 1, wherein the cell search and measurement configuration further comprises:
the information of at least one carrier frequency associated with at least one identity of a cell.

3. The method of claim 1, wherein receiving the cell search and measurement configuration comprises:
receiving the cell search and measurement configuration from a dedicated signaling which is transmitted via a downlink shared channel and is dedicated to be transmitted to the UE.

4. The method of claim 1, wherein receiving the cell search and measurement configuration comprises:
receiving the cell search and measurement configuration from a broadcasted signaling which is transmitted via a broadcast channel.

5. The method of claim 1, wherein the at least one carrier frequency of the cell search and measurement configuration associated with an allowed cell list comprises at least one identity of a cell, and performing the cell search and measurement procedure further comprises:
performing the cell search and measurement procedure only among the cells that appear on the allowed cell list associated with the carrier frequency.

6. The method of claim 1, wherein the at least one carrier frequency of the cell search and measurement configuration associated with a forbidden cell list comprises at least one identity of a cell, and performing the cell search and measurement procedure further comprises:
not performing the cell search and measurement procedure among the cells that appear on the forbidden cell list associated with the carrier frequency.

7. The method of claim 1, further comprising:
only performing the cell search and measurement procedure on the at least one carrier frequency associated with the UE which has determined NTN TA when at least one carrier frequency is associated with the UE.

8. The method of claim 1, further comprising:
not performing the cell search and measurement procedure when there is no any carrier frequency or cell in the cell search and measurement configuration associated with the UE which has determined NTN TA.

9. The method of claim 1, further comprising:
stop performing the cell search and measurement procedure by applying the cell search and measurement configuration when the cell search and measurement configuration is outdated or invalid.

10. The method of claim 9, wherein:
the outdated or invalid of the cell search and measurement configuration is determined according to a validity time associated with the cell search and measurement configuration.

11. The method of claim 10, wherein:
the validity time is configured by a value of a timer that the cell search and measurement configuration is valid before the expiry of the timer.

12. The method of claim 10, wherein:
the validity time is configured by a starting time and a stopping time of an applicable period of the cell search and measurement configuration.

13. The method of claim 9, further comprising:
determining the outdated or invalid of the cell search and measurement configuration according to a validity area which is associated with one or more NTN tracking area identifier (TAI), or is associated with a geographic area represented in a form of latitude and longitude coordination, or be associated with one or more NTN cell identities.

14. The method of claim 1, further comprising:
stop performing the cell search and measurement procedure by applying the cell search and measurement configuration when the UE cannot determine the NTN TA associated with the UE location.

15. The method of claim 1, wherein:
the at least one carrier frequency is further associated with a timing configuration which is a time domain configuration information for performing the cell search and measurement procedure on the carrier frequency.

16. The method of claim 15, wherein:
the timing configuration is associated with a validity period and the validity period is represented by the starting time and stopping time of the validity period.

17. The method of claim 15, further comprising:
the timing reference is associated with a validity area which is associated with one or more NTN tracking area identifier (TAI), or is associated with a geographic area represented in a form of latitude and longitude coordination, or be associated with one or more NTN cell identities.

18. The method of claim 1, wherein performing the cell search and measurement procedure comprises:
determining, from the cell search and measurement configuration, a timing configuration; and
performing the cell search and measurement procedure by using the timing configuration.

19. The method of claim 18, wherein the timing configuration comprising:
an offset value to indicate the start of an occasion including when a first subframe occurs at an SFN (system frame number) based on a reference timing of the timing configuration to receive and measure reference signals;
a duration value in which to receive and measure reference signals; and
a periodicity value indicates the periodicity of the receiving of reference signals.

20. The method of claim 1, wherein performing the cell search and measurement procedure comprises:
performing the cell search and measurement procedure for a first carrier frequency of a first cell of the cells without applying the timing configuration associated with the first carrier frequency of the cell search and measurement configuration when no first reference timing been determined as available for the cell search and measurement procedure; and
using the timing associated with the first carrier frequency of the first cell as a first reference timing determined for the cell search and measurement procedure in response to the first reference timing being unavailable from the cell search and measurement configuration if a first cell is detected.

21. The method of claim 20, wherein performing the cell search and measurement procedure comprises:
determining an applicable offset value for a second carrier frequency in response to the first reference timing being available from the cell search and measurement configuration, by calculating the difference value between the offset value of the timing configuration associated with the first carrier frequency and the offset value of the timing configuration associated with the second carrier frequency; and
generating an executive timing configuration associated with the second carrier frequency for performing the cell search and measurement procedure on the second carrier frequency by using the applicable offset value to substitute the offset value of the timing configuration associated with the second carrier frequency.

22. The method of claim 21, wherein performing the cell search and measurement procedure further comprises:
performing cell search and measurement procedure for the second carrier frequency of a second cell of the cells by using the executive timing configuration associated with the second carrier frequency.

23. The method of claim 19, wherein the cell search and measurement configuration comprises an allowed cell list, and performing the cell search and measurement procedure among the neighboring cells further comprising:
performing the cell search and measurement procedure only among the neighboring cells that appear on the allowed cell list.

24. The method of claim 19, wherein the cell search and measurement configuration further comprises a forbidden cell list, and performing the cell search and measurement procedure among the neighboring cells further comprising:
not performing the cell search and measurement procedure among the neighboring cells that appear on the forbidden cell list.

25. The method of claim 1, wherein the cell search and measurement configuration further comprises a public land and mobile network (PLMN) list, and performing the cell search and measurement procedure further comprising:
not performing the cell search and measurement procedure if none of home PLMN of the UE, registered PLMN of the UE, equivalent home PLMN (EHPLMN) of the UE or equivalent registered PLMN (ERPLMN) of the UE appear on the PLMN list.

26. The method of claim 1, wherein the cell search and measurement configuration comprise a synchronization signal block (SSB)-based radio resource management (RRM) measurement timing configuration (SMTC) associated with a carrier frequency of the cell search and measurement configuration.

27. The method of claim 19, wherein an entry of the allowed cell list, forbidden cell list, or the PLMN list is associated with a timing configuration as indicated by the cell search and measurement configuration.

28. The method of claim 26, wherein the SMTC comprises an offset value for calculating the starting of an occasion for receiving a SSB, a duration window for receiving a SSB, and a periodicity of the measurement window.

29. A user equipment (UE) comprising:
a wireless receiver,
a processor coupled to the wireless receiver and configured to:
receive a cell search and measurement configuration from a non-terrestrial network (NTN) for performing the cell search and measurement procedure, the cell search and measurement configuration comprises information of at least one carrier frequency and at least one NTN tracking area (TA) information associated with the carrier frequency for performing a cell search and measurement procedure, wherein the cell search and measurement configuration relates to a cell belonging to a terrestrial network (TN),
initiate the cell search and measurement procedure for the cell of belonging to the TN, and
perform the cell search and measurement procedure by applying the cell search and measurement configuration.

* * * * *